(12) United States Patent
Tabata et al.

(10) Patent No.: US 7,744,825 B2
(45) Date of Patent: Jun. 29, 2010

(54) N-PHASE OZONE GENERATOR

(75) Inventors: Yoichiro Tabata, Tokyo (JP); Yujiro Okihara, Tokyo (JP); Masayuki Ishikawa, Tokyo (JP); Tetsuya Saitsu, Tokyo (JP)

(73) Assignee: Toshiba Mitsubishi-Electric Industrial Systems Corporation, Tokyo (JP)

( * ) Notice: Subject to any disclaimer, the term of this patent is extended or adjusted under 35 U.S.C. 154(b) by 1042 days.

(21) Appl. No.: 10/581,044

(22) PCT Filed: Sep. 29, 2004

(86) PCT No.: PCT/JP2004/014274

§ 371 (c)(1),
(2), (4) Date: May 30, 2006

(87) PCT Pub. No.: WO2006/035506

PCT Pub. Date: Apr. 6, 2006

(65) Prior Publication Data

US 2007/0134140 A1    Jun. 14, 2007

(51) Int. Cl.
*B01J 19/08* (2006.01)

(52) U.S. Cl. .................................. 422/186.15

(58) Field of Classification Search ............ 422/186.07, 422/186.15
See application file for complete search history.

(56) References Cited

U.S. PATENT DOCUMENTS 5,411,713 A    5/1995    Iwanaga

| 5,932,116 A | | 8/1999 | Matsumoto et al. |
| 5,942,196 A | | 8/1999 | Tabata et al. |
| 6,143,256 A | * | 11/2000 | Shinagawa et al. ..... 422/186.15 |
| 6,284,205 B1 | | 9/2001 | Murata et al. |
| 2004/0076560 A1 | * | 4/2004 | Tabata et al. ........... 422/186.07 |

FOREIGN PATENT DOCUMENTS

| JP | 54-005895 | 1/1979 |
| JP | 06-080403 | 3/1994 |
| JP | 06-305706 | 11/1994 |
| JP | 07-157302 | 6/1995 |
| JP | 07-240268 | 9/1995 |
| JP | 08-333103 | 12/1996 |
| JP | 09-059006 | 3/1997 |
| JP | 10-025104 | 1/1998 |
| JP | 2001-026405 | 1/2001 |
| JP | 2004-142963 | 5/2004 |

* cited by examiner

*Primary Examiner*—Kishor Mayekar
(74) *Attorney, Agent, or Firm*—Leydig, Voit & Mayer, Ltd.

(57) ABSTRACT

A compact, inexpensive, large-capacity ozone generator with increased ease of apparatus maintenance. An ozone power supply includes an n-phase inverter for obtaining an AC voltage having a predetermined frequency and outputting an n-phase AC voltage waveform; n reactors and an n-phase transformer for converting an n-phase AC voltage to a high AC voltage; n high-voltage terminals for outputting the n-phase high AC voltage; and a low-voltage terminal having a common potential. Ozone generator units are electrically divided into n pieces within a discharge chamber. Each ozone generator unit includes n high-voltage electrode terminals and one low-voltage electrode terminal, common to all ozone generator units. Each ozone generator unit supports an n-phase AC discharge to generate ozone.

17 Claims, 15 Drawing Sheets

N-PHASE OZONE GENERATOR

TECHNICAL FIELD

The present invention relates to a large-capacity ozone generator for receiving a material gas supply based on oxygen and generating an ozone gas, and more particularly to an n-phase ozone generator having an n-phase AC power supply configuration for an ozone power supply and a configuration for electrically dividing ozone generator discharge cells into n discharge cells (ozone generation units).

BACKGROUND ART

A conventional large-capacity ozone generator is typically configured as shown in FIG. 10 to construct a several-tens-to-several-hundreds-of-kilograms-per-hour class, large-capacity ozone generator. This large-capacity ozone generator is adopted to use ozone for advanced sewage treatment and pulp bleaching.

FIG. 10 shows an example of a conventional, large-capacity ozone generator that generates ozone at a rate of 35 kg/h. The conventional large-capacity ozone generator 1100 includes a water tank for cooling, a huge tank (3000 mm in diameter and 4500 mm in length) filled with an oxygen material gas, and 600 cylindrical glass high-voltage pipes 5, which are 40 mm in diameter and 2000 mm in length. A cylindrical high-voltage electrode pipe is mounted in the cylindrical glass high-voltage pipes. The cylindrical high-voltage electrode pipe is coated with a high-voltage electrode 3.

The reference numeral 2000 denotes a transformer for supplying a high voltage to the plurality of cylindrical glass high-voltage pipes 5. The reference numeral 3000 denotes a plurality of series-connected reactors for suppressing an inverter output current. The reference numeral 4000 denotes a single-phase inverter element for outputting a single-phase AC voltage from a DC voltage input. The reference numeral 5000 denotes a converter (rectifier) for supplying a DC voltage that is to be input into an inverter. The reference numeral 6000 is an input transformer for cutting off a third harmonic, which arises out of a load on a three-phase commercial AC power supply and ozone generator. The reference numeral 4100 denotes a drive circuit for driving the inverter element 4000. The reference numeral 4200 denotes a control circuit for the inverter element 4000. The reference numeral 4300 denotes a computer for exercising management and issuing condition setup instructions concerning, for instance, the status of the ozone generator and the current output to the inverter. FIG. 11 schematically indicates the number of 40 mm diameter cylindrical glass pipes 5 that can be mounted within a cross section 200 mm square. FIG. 12 is a characteristics diagram illustrating the relationship between an inverter instruction signal and inverter output waveform.

In the conventional large-capacity ozone generator, a three-phase commercial AC power supply enters the input transformer 6000. A converter 5000 converts the output of the input transformer 6000 to a DC voltage. The obtained DC voltage enters the inverter element 4000. The inverter element 4000 converts the DC voltage to an AC voltage having a frequency of approximately 1 kHz.

The inverter element 4000 receives ozone performance conditions from the computer 4300 and forwards them to the control circuit 4200. The control circuit 4200 creates an inverter control signal. Predetermined control signals are alternately input from the drive circuit 4100 to the inverter element 4000 as the ON-OFF signals for two instruction signals 7001a, 7001b shown in FIG. 12. The inverter then outputs an AC rectangular voltage that is synchronized with the resulting pulse.

When the AC rectangular voltage enters the transformer 2000 via the series-connected reactors 3000, which suppress the inverter output current, the secondary side of the transformer outputs a high-voltage AC waveform Y1, which has a voltage of approximately 10 kV and is similar to a 1 kHz sine waveform. This high-voltage AC waveform is applied to the plurality of cylindrical glass high-voltage pipes 5 from a high-voltage terminal 120 of the large-capacity ozone generator 1100. Another low voltage of a secondary voltage is connected to a ground terminal (low-voltage terminal) YG of the large-capacity ozone generator 1100. When a high voltage is applied to the ozone generator 1100 as described above, a silent electric discharge occurs between the high-voltage electrode 3 and low-voltage electrode via the cylindrical glass high-voltage pipes 5, which are dielectrics. Consequently, ozone is generated so that an ozonized gas can be obtained from an ozone outlet 110 of the ozone generator 1100.

The performance specifications for the above conventional ozone generator 1100 are as indicated in Table 1 if it is a 35 kg/h class, large-capacity ozone generator. The large-capacity ozone generator is a huge apparatus, which has a diameter of 3000 mm, a length of 4000 mm, and a cubic capacity of 28 $m^3$. Further, the power supply capacity is 452 kW. The load power factor is approximately 30%. Therefore, the load current is 150 A. The load voltage is 10 kV. The load capacity is 1500 kVA. It means that the transformer 2000 is extremely large.

TABLE 1

| | Conventional cylindrical multi-pipe method specifications |
|---|---|
| Discharge cell cubic volume | 20 cm × 20 cm × 20 cm (0.003 $m^3$) |
| Number of discharges | 600 (ϕ40-2000) |
| Discharge area ($m^2$) | 150.72 |
| Ozone generator tank cubic capacity | ϕ3000-4000 mm (28 $m^3$) |
| Rated ozone concentration(g/$m^3$) | 180 |
| Maximum ozone concentration (g/$m^3$) | 220 |
| Ozone yield (kWh/$kg_{-o3}$) | 11 |
| Discharge power density (W/$cm^2$) | 0.3 |
| Discharge power (kW) | 452 |
| Ozone generation rate (kg/h) | 41.11 |
| Gas flow rate (L/min) | 3806.1 |
| Operating frequency (kHz) | 1 |
| Load power factor (%) | 30 |
| Load current (A) | 150.72 |
| Load voltage (kV) | 10 |

The relationship between the discharge load resistance and the ozone capacity of the ozone generator is as indicated in a characteristics diagram in FIG. 13. In FIG. 13, characteristic E represents the characteristic of the cylindrical multi-pipe ozone generator that operates on a conventional AC voltage having a frequency of 1 kHz. The discharge resistance characteristic is as indicated by 8001a. The larger the capacity is, the smaller the discharge resistance (load impedance) becomes. Therefore, it is difficult to disperse a silent electric discharge over a large discharge area uniformly and steadily.

The relationship between the frequency and the discharge voltage to be applied to the ozone generator is as indicated in a characteristic diagram in FIG. 14. In FIG. 14, characteristic F (solid line) is a discharge voltage characteristic prevailing at a discharge gap length of 0.1 mm and at a discharge power density of 1.5 W/$cm^2$. Characteristic G (dotted line) is a discharge voltage characteristic prevailing at a discharge gap length of 0.3 mm and at a discharge power density of 0.3 W/cm$^2$. The lower the frequency is, the higher the discharge voltage becomes. The higher the discharge power density, the higher the discharge voltage. The conventional cylindrical multi-pipe ozone generator generates ozone at a discharge gap length setting of approximately 0.3 to 0.6 mm, at a frequency setting of 1 kHz to 3 kHz, and at a discharge power density setting of 0.3 W/cm$^2$. Therefore, the operation region in FIG. 14 is 8001*b* and the discharge voltage is approximately 10 kV. If the discharge power density is higher than 0.3 W/cm$^2$, the discharge voltage increases by more than 12 kV. Therefore, the discharge power density should not be higher than 0.3 W/cm$^2$ from the viewpoint of practical apparatus use.

Further, when a plurality of 40 mm diameter and 2000 mm long cylindrical glass high-voltage pipes 5 are inserted at an operating frequency of 1 kHz and at a discharge power density of 0.3 W/cm$^2$, the cubic capacities of a conventional ozone generator generating ozone at a rate of 7 kg/h and a conventional ozone generator generating ozone at a rate of 70 kg/h are as large as 0.7 m$^3$ and 56 m$^3$, respectively, as indicated by 8003*a* in FIGS. 15 and 8003*b* in FIG. 16. Since the power factor of the ozone generator is as low as 30% at an operating frequency of 1 kHz, the discharge capacity is extremely large. Thus, the transformer 2000 and inverter element 4000 are very large. Consequently, the large-capacity ozone generator is a huge system.

Various prior arts were disclosed to technically improve the conventional large-capacity ozone generator.

First of all, a large-capacity ozone generator, which was disclosed by Japanese Patent Application No. 2002-306941 prior to the present invention, includes a chamber. The chamber houses a plurality of discharge cells. The discharge cells have a discharge space having a gap of approximately 0.1 mm. The discharge space is provided between two rectangular flat-plate electrodes and two flat-plate electrodes via a dielectric. In this ozone generator, a plurality of discharge cell electrodes, which are mounted in the chamber, are connected in parallel. A high AC voltage is applied between the electrodes so that a uniform dielectric barrier discharge (silent electric discharge) occurs in the gap section of each discharge cell via the dielectric. At the same time, a material gas based on an oxygen gas is allowed to enter the chamber so that a gas uniformly passes from the outer circumference of a discharge cell to the discharge space having a gap as short as 0.1 mm. Consequently, a large amount of ozone gas is obtained. Further, the operating frequency is set to 10 kHz to reduce the discharge voltage. In addition, a discharge power density of 1.0 W/cm$^2$ is employed for performance improvement.

A silent electric discharge type ozone generator power supply, which was disclosed by Japanese Patent Laid-Open No. 1997-59006 prior to the present invention, includes a plurality of discharge pipes and a transformer. In the transformer, the discharge pipes are arranged and three-phase-connected to a three-phase current type inverter in order to improve the load power factor and ozone generation efficiency.

An ozone generation structure, which was disclosed by Japanese Patents Laid-Open No. 1994-305706 and Laid-Open No. 1995-240268 prior to the present invention, includes an n-phase AC power supply, which generates an n-phase AC output, and n discharge electrode rods, which are positioned in a discharge chamber. One end of each discharge electrode rod is positioned to form an n-sided equilateral polygon. An n-phase AC voltage is applied to the n discharge electrode rods so that a corona discharge occurs near the electrode rods between electrodes. Ozone is then generated by allowing a material gas containing oxygen to flow along the discharge electrode rods, which are arranged to form an n-sided equilateral prism. This polyphase AC multi-electrode corona discharge device exhibits higher efficiency than a single-phase corona discharge device because the former can use a planar discharge between electrodes for ozone generation purposes.

Another ozone generation structure, which was disclosed by Japanese Patent Publication No. 1996-22724 prior to the present invention, includes an n-phase AC output device for generating an n-phase AC output and n discharge electrode rods that are positioned in a discharge chamber. One end of each discharge electrode rod is positioned to form an n-sided equilateral polygon. The other end of each discharge electrode rod is positioned close to a vertex, that is, positioned to form an n-sided equilateral pyramid. An n-phase AC voltage is applied to n discharge electrode rods so that a corona discharge occurs near the electrode rods between electrodes. Ozone is then generated by allowing a material gas containing oxygen to flow from the base section of the discharge electrode rods, which are positioned to form an n-sided equilateral pyramid, to the vertex of the n-sided equilateral pyramid. This polyphase AC multi-electrode corona discharge device exhibits higher efficiency than a single-phase corona discharge device because the former can use a planar discharge between electrodes for ozone generation purposes. This invention is equivalent to the invention disclosed by Japanese Patent Laid-Open No. 1995-240268 although the two inventions differ in electrode rod arrangement.

Another ozone generator, which was disclosed by Japanese Patent Laid-Open No. 1995-157302 prior to the present invention, includes transformers to which a three-phase AC power supply is star-connected (Δ-connected). One end of a secondary terminal of each transformer is connected to a cylindrical terminal as a common electrode. The other end of the secondary terminal is connected to a rod-shaped high-voltage electrode. A high AC voltage is applied to the rod-shaped high-voltage electrode.

In another ozone generator, which was disclosed by Japanese Patent Laid-Open No. 1998-25104 prior to the present invention, discharge cells, which include a plurality of dielectrics and high-voltage electrodes, are multi-layered over a single ground electrode (low-voltage electrode surface). Ozone power supplies, which are based on the combination of a three-phase inverter and a three-phase transformer, and multi-layered discharge cells are divided into three cell groups. A three-phase high AC voltage is applied to the high-voltage electrode section of each cell group. In an alternative embodiment, four ozone power supplies are connected to supply a plurality of high AC voltages to a single discharge chamber. The use of a 3-phase ozone power supply makes it possible to drive three discharge cells and make the power supply section compact and inexpensive.

In another ozone generator, which was disclosed by Japanese Patent Laid-Open No. 2001-26405 prior to the present invention, ozone generator units are stacked. The resulting ozone generator is compact although it has a large capacity.

An ultracompact ozone generator unit 100, which is shown in FIG. 7, was disclosed by Japanese Patent Application No. 2002-306941 prior to the present invention. In FIG. 7, the reference numeral 3 denotes a high-voltage electrode, which is very thin (approximately less than 100 μm in thickness) and sandwiched between thin flat-plate dielectrics 5, which have a thickness of less than 1 mm. The reference numeral 7 denotes a flat-plate electrode, which is a rectangular low-voltage electrode that is 20 mm in width, 500 mm in length, and several millimeters in thickness. A plurality of very thin high-voltage electrodes 3 that are sandwiched between flat-plate dielectrics 5, which are less than 1 mm in thickness, and a plurality of rectangular low-voltage electrodes 7, which are several millimeters in thickness, are stacked alternately to form an ozone generator unit 100, which measures approximately 200 mm by 200 mm and has a length of 500 mm. Two etched flat plates are joined together so that the interior of each rectangular low-voltage electrode 7 is structured to provide a water cooling path and ozone gas acquisition scheme. To form a short gap discharge space, a 0.1 mm protruding spacer is provided on both sides of each rectangular low-voltage electrode 7. To invoke a uniform oxygen gas flow in the rectangular discharge space and improve the ozone generation performance, the employed electrode is devised so as to obtain a plurality of ozone gases from the rectangular discharge space. The water inlet and outlet for electrode cooling and the ozone gas outlet are not shown in FIG. 7. However, the detailed configuration is indicated in Japanese Patent Application NO. 2002-306941.

Japanese Patent Application No. 2002-306941 states that an ultracompact ozone generator 1100, whose capacity is one several-th of the conventional capacity, can be configured, as indicated by 8004a in FIG. 15 or by 8004b in FIG. 16, by mounting a plurality of discharge units 100 in a single discharge chamber as indicated in FIG. 6, raising the power frequency from a conventional level of 3 kHz or lower to approximately 6 to 20 kHz as indicated by 8002b in FIG. 14, and increasing the discharge power density of the ozone generator from a conventional level of 0.3 W/cm$^2$ to approximately 1 to 2 W/cm$^2$.

In the conventional cylindrical multi-pipe ozone generator, the ozone performance characteristic is such that the maximum ozone concentration is approximately 220 g/m$^3$ as indicated by 8005a in FIG. 17. In the multi-layer flat-plate ozone generator, on the other hand, the maximum ozone concentration is 340 g/m$^3$ as indicated by 8005b in FIG. 17. It means that the resulting ozone concentration is 1.5 times higher than the conventional level. As regards the ozone concentration achieved by the large-capacity ozone generator, the electrical energy required for acquiring ozone gas at a rate of 1 kg/h (ozone yield) is more important than the maximum ozone concentration. If greater importance is attached to the ozone yield as indicated in FIG. 17, the ozone concentration is approximately 180 g/m$^3$ during the use of the cylindrical multi-pipe ozone generator and 210 g/m$^3$ during the use of the multi-layer flat-plate ozone generator. It means that the ozone yield is increased by less than 20%.

Table 2 shows the comparison between the conventional cylindrical multi-pipe ozone generator shown in FIG. 11 and the multi-layer flat-plate ozone generator (on which the present invention is based) shown in FIG. 7. The table indicates that the multi-layer flat-plate ozone generator is superior to the conventional cylindrical multi-pipe ozone generator in terms of capacity and compactness. However, the conventional cylindrical multi-pipe ozone generator is superior to the multi-layer flat-plate ozone generator in terms of apparatus simplicity, assembling ease, and production cost. However, Japanese Patent Application No. 2002-306941 states that a rectangular, high-performance, multi-layer flat-plate ozone generator can provide apparatus simplicity and assembling ease. It means that the multi-layer flat-plate ozone generator is also becoming advantageous in terms of capacity.

TABLE 2

| | Cylindrical multi-pipe type | Multi-layer flat-plate type |
|---|---|---|
| Discharge cell cubic volume | 20 cm × 20 cm × 50 cm | 20 cm × 20 cm × 50 cm |
| Number of discharges | 25 (φ40-500) | 32 (200 × 5-500) |
| Discharge area (m$^2$) | 1.51 | 2.76 |
| Rated ozone concentration (g/m$^3$) | 180 | 210 |
| Maximum ozone concentration (g/m$^3$) | 220 | 340 |
| Ozone yield (kWh/kg$_{-o3}$) | 11 | 9.5 |
| Discharge power density (W/cm$^2$) | 0.3 | 1.1 |
| Discharge power (kW) | 4.52 | 30.41 |
| Ozone generation rate (kg/h) | 0.41 | 3.20 |
| Gas flow rate (L/min) | 38.1 | 254.1 |
| Operating frequency (kHz) | 1 | 10 |
| Voltage (kV) | 10 | 6 |

In an ozone generator including a short gap discharge device, in which the frequency setting is several kilohertz or higher and the discharge power density is 0.5 W/cm$^2$ or higher, the relationship between the ozone capacity and discharge resistance, which is shown in FIG. 13, indicates that the maximum single unit capacity is limited. In FIG. 13, discharge characteristics A to D at a discharge power density of 1.4 W/cm$^2$ represent the characteristics of the multi-layer flat-plate ozone generator. Discharge characteristic E represents the characteristic of the conventional cylindrical multi-pipe ozone generator and prevails at a frequency of 1 kHz and at a discharge power density of 0.3 W/cm$^2$. As indicated by characteristic region 8002a for the multi-layer flat-plate type, the use of a large-capacity ozone generator remarkably reduces the discharge resistance of the ozone generator and makes it difficult to disperse a discharge over the entire surface and generate stable ozone. As a result, it is found that the use of a large-capacity ozone generator in place of a small-capacity ozone generator cannot obtain high-concentration ozone and reduces the ozone yield. Further, the results of experiments indicate that a discharge resistance of approximately 20 ohms or more is required for increasing the ozone generator capacity in consideration of apparatus controllability and stability. It is therefore found that the maximum single unit capacity of the multi-layer flat-plate ozone generator is approximately 10 kg/h. An increase in the single unit capacity results in a poor discharge power factor and increases the peak current for the load current value. It means that an economical limit is imposed due, for instance, to an increase in the power consumption for ozone generation. Consequently, the single unit capacity of the ozone generator is limited. Furthermore, an increase in the single unit capacity remarkably reduces the discharge cell load impedance. It means that the power supply control capability for stable supply of generated ozone is extremely degraded. As a result, various problems, including the inability to increase the single unit capacity, have arisen.

Meanwhile, an ozone water treatment apparatus, which uses ozone, or an ozone pulp bleaching apparatus, which uses ozone for pulp bleaching, requires several tens to several hundreds of kilograms of ozone per hour. If a several-hundreds-of-kilograms-per-hour class, cylindrical, multi-pipe ozone generator is employed, a large-scale facility having a cubic volume of approximately 200 m$^3$ results due to electrode shape. In the field of water treatment or pulp bleaching, which requires the use of ozone, therefore, an extremely compact apparatus having a single unit capacity as large as several tens of kilograms to 100 kilograms per hour and exhibiting high ozone yield and high ozone concentration is demanded.

To configure an ozone generator having a single unit capacity as large as several tens of kilograms to 100 kilograms per hour, it is found necessary, as described above, not only to employ a chamber configuration that accepts a plurality of discharge cells, but also to review the ozone generator system configuration including an ozone power supply. It is also found necessary that a plurality of ozone power supplies be arranged in an ozone generator unit and rendered electrically independent of each other to control the amount of ozone generation.

Patent Document 1: Japanese Patent Laid-Open No. 1997-59006

Patent Document 2: Japanese Patent Laid-Open No. 1994-305706

Patent Document 3: Japanese Patent Laid-Open No. 1995-240268

Patent Document 4: Japanese Patent Publication No. 1996-22724

Patent Document 5: Japanese Patent Laid-Open No. 1995-157302

Patent Document 6: Japanese Patent Laid-Open No. 1998-25104

Patent Document 7: Japanese Patent Laid-Open No. 2001-26405

DISCLOSURE OF THE INVENTION

Problems to be Solved by the Invention

The method disclosed by Japanese Patent Laid-Open No. 1997-59006 is such that a plurality of three-phase discharge pipes, each of which includes three electrodes, are installed. However, this method involves the use of a complicated discharge pipe structure and cannot readily increase the capacity to several tens of kilograms to 100 kilograms per hour.

The inventions disclosed by Japanese Patents Laid-Open No. 1994-305706, Laid-Open No. 1995-240268, Publication No. 1996-22724, and Laid-Open No. 1995-157302 arrange discharge electrode rods in a discharge pipe so as form an n-sided equilateral prism, and include an n-phase AC power supply, which generates ozone efficiently by making use of a plurality of planar discharges. However, the use of such a configuration involves a complicated discharge pipe structure. Further, a very large discharge pipe needs to be employed to implement an ozone generator having a capacity as large as several tens of kilograms to 100 kilograms per hour.

The ozone generator power supply disclosed by Japanese Patent Laid-Open No. 1998-25104 uses a transformer as an ozone power supply. This transformer is three-phase-connected to a three-phase current type inverter. A large-capacity ozone generator can be implemented by using a plurality of three-phase power supplies and ozone generators. However, when a relatively compact ozone generator is used, a several-tens-of-kilograms-to-100-kilograms-per-hour class large-capacity power supply cannot be configured with a single ozone power supply. Therefore, the size of the large-capacity power supply is enlarged. Further, it is impossible to implement a large-capacity ozone apparatus at a relatively low cost.

As described above, when a conventional method for ozone generation is used to generate ozone at a rate of as high as several tens of kilograms to 100 kilograms per hour, the use of a very large ozone generator is required. With such a conventional ozone generation method, it is therefore impossible to implement an ozone generator at a low cost.

The present invention has been made to solve the above problems. It is an object of the present invention to provide a compact, inexpensive, large-capacity ozone generator. More particularly, it is an object of the present invention to provide a compact, inexpensive ozone generator configuration that includes a configuration for supplying electricity to an ozone generator unit, an ozone power supply configuration, and a control scheme, and increase the ease of maintenance.

Means For Solving The Problems

The present invention provides an n-phase ozone generator comprising:

an ozone power supply for rectifying a voltage having a commercial frequency, causing an inverter to convert the rectified voltage to an AC voltage having a predetermined frequency, causing a transformer and a reactor to convert the AC voltage having the predetermined frequency to a high AC voltage, and outputting the resulting high AC voltage and a low voltage;

a discharge chamber having a high-voltage terminal for inputting the high AC voltage of the ozone power supply and a low-voltage terminal for inputting the low voltage; and a plurality of multi-layer flat-plate ozone generator units that are stacked in the discharge chamber and formulated by alternately stacking a plurality of flat-plate high-voltage electrodes and low-voltage electrodes, wherein the ozone power supply includes an n-phase inverter for converting a rectified voltage to an n-phase AC voltage having a predetermined frequency and outputting an n-phase AC voltage waveform; n reactors and an n-phase transformer for converting an n-phase AC voltage, which is output from the n-phase inverter, to an n-phase high AC voltage; n high-voltage terminals for outputting an n-phase high AC voltage; and a low-voltage terminal for outputting a low voltage sharing a common potential with n high voltages;

wherein the plurality of multi-layer flat-plate ozone generator units are electrically divided into n pieces within the discharge chamber, high-voltage electrodes of an ozone generator unit being handled as the same high-voltage potentials;

wherein, from each ozone generator unit, n high-voltage electrode terminals and one low-voltage electrode terminal, which is common to all low-voltage electrodes of the ozone generator units, are pulled out to connect n high-voltage terminals for an ozone power supply output to n high-voltage electrode terminals of the ozone generator units; and wherein one low-voltage electrode terminal of the ozone generator units is connected to a low-voltage terminal of the ozone power supply output so that each ozone generator unit invokes an n-phase AC discharge to generate ozone.

Also, the ozone power supply is positioned between the n-phase transformer and the plurality of ozone generator units, and includes a low-voltage electrode terminal that is common to all low-voltage electrodes of the ozone generator units and n reactors that are connected in parallel with the n ozone generator units.

Also, the ozone power supply includes a time division device that is capable of equally dividing the time into 3 to n phases; and wherein, when a designated phase count signal is entered into the time division device from the outside, the time division device issues an equally-time-divided signal to an inverter so that variable control can be exercised for an arbitrary phase while maintaining balance gradually for 3 to n phases.

Also, n reactors and n transformers of the ozone power supply are formed when a plurality of U- or L-shaped cores, around which a transformer coil or a reactor coil is wound, are closely attached to the opposite side around an I-shaped core having a polygonal cross section; and wherein coils of the n transformers or of the n reactors are Δ-connected or star-connected.

Also, the n reactors or n transformers of the ozone power supply are configured so that the U- or L-shaped cores that are closely attached to the opposite side around the polygonal I-shaped core can be readily mounted and demounted; and wherein a transformer that is configured as an n-phase transformer or reactor can be converted to a 3- to n-phase transformer or reactor.

Also, a fuse or a breaker is provided between n high-voltage terminals of the ozone power supply and n high-voltage electrode terminals of the ozone generator units.

Also, the output sections of n high-voltage terminals of the ozone power supply are provided with a current detector; and wherein, when a current flow in a certain phase exceeds a predetermined value, the affected phase is electrically cut off so that an n-1 phase operation is performed.

Also, output sections of n high-voltage terminals of the ozone power supply and a low-voltage potential output section are provided with a voltage detector; and wherein, when a voltage applied to a low-voltage potential and a certain phase is below a predetermined value, the affected phase is electrically cut off so that an n-1 phase operation is performed.

Advantages of the Invention

The n-phase ozone generator according to the present invention causes each ozone generator unit to invoke an n-phase AC discharge and generate ozone. Therefore, it is possible to implement a large-capacity ozone generator that generates high-concentration ozone while exhibiting high ozone yield. It is also possible to obtain a compact, inexpensive ozone generator. Further, a parallel reactor is provided for each n-phase ozone generator unit so that parallel resonance between the ozone generator unit and parallel reactor is used to improve the load power factor. Therefore, the power supply capacity can be reduced to make the sizes of an inverter and transformer very small.

In the reactor and transformer, which are ozone generator attachments, a plurality of U- or L-shaped cores, around which a transformer coil or reactor coil is wound, are closely attached to the opposite side around an I-shaped core having a polygonal cross section. Consequently, n transformers or reactors are formed. Further, the coils of n transformers or reactors are Δ-connected or star-connected to form a transformer configuration or reactor configuration. Therefore, the sizes of the reactor and transformer can be made very small.

In addition to the above advantages, when a time division device for equally dividing the time into 3 to n phases is installed and a designated phase count signal is entered into the time division device from the outside, the time division device issues an equally-time-divided signal to the inverter. Variable control can then be exercised for an arbitrary phase while maintaining balance gradually for 3 to n phases. In the reactor and transformer, the U- or L-shaped core that is closely attached to the opposite side around the polygonal I-shaped core can be readily mounted and demounted. Further, when a fuse or breaker is installed between n high-voltage terminals of a power supply and n high-voltage electrode terminals, it is possible to cut off an unnecessary ozone generator unit phase with ease. Furthermore, the current value or voltage of each ozone generator unit phase can be monitored to automatically detect a defective ozone generator unit and eliminate a defective ozone generator. Therefore, even if a part of a generator unit becomes defective, recovery can be easily achieved simply by cutting off, for instance, the connection to the defective phase. Consequently, a large-scale system can be restored to normal within a very short period of time.

DESCRIPTION OF SYMBOLS

100a~100f plurality of ozone generator units
1100 n-phase ozone generator
15a~15f plurality of fuses or breakers
1500 fuse or breaker block
201a~201f plurality of parallel reactors
2000-a parallel reactor block
202a~202f plurality of transformers
2000-b n-phase transformer block
301a~301f plurality of series reactors
3000 series reactor block
401a~401f plurality of inverter elements
4000 n-phase inverter element block
5000 converter (rectifier) block
6000 input transformer block
4100 inverter drive circuit
4200 control circuit
4300 computer
120 high-voltage terminal

BEST MODE FOR CARRYING OUT THE INVENTION

Embodiments of the present invention will now be described in detail with reference to the accompanying drawings. The following embodiment description deals with a 6-phase ozone generator that comprises a 6-phase inverter and a 6-phase transformer. However, it goes without saying that the present invention is applicable to an n-phase ozone generator that comprises an n-phase inverter and an n-phase transformer.

First Embodiment

Figure 1:
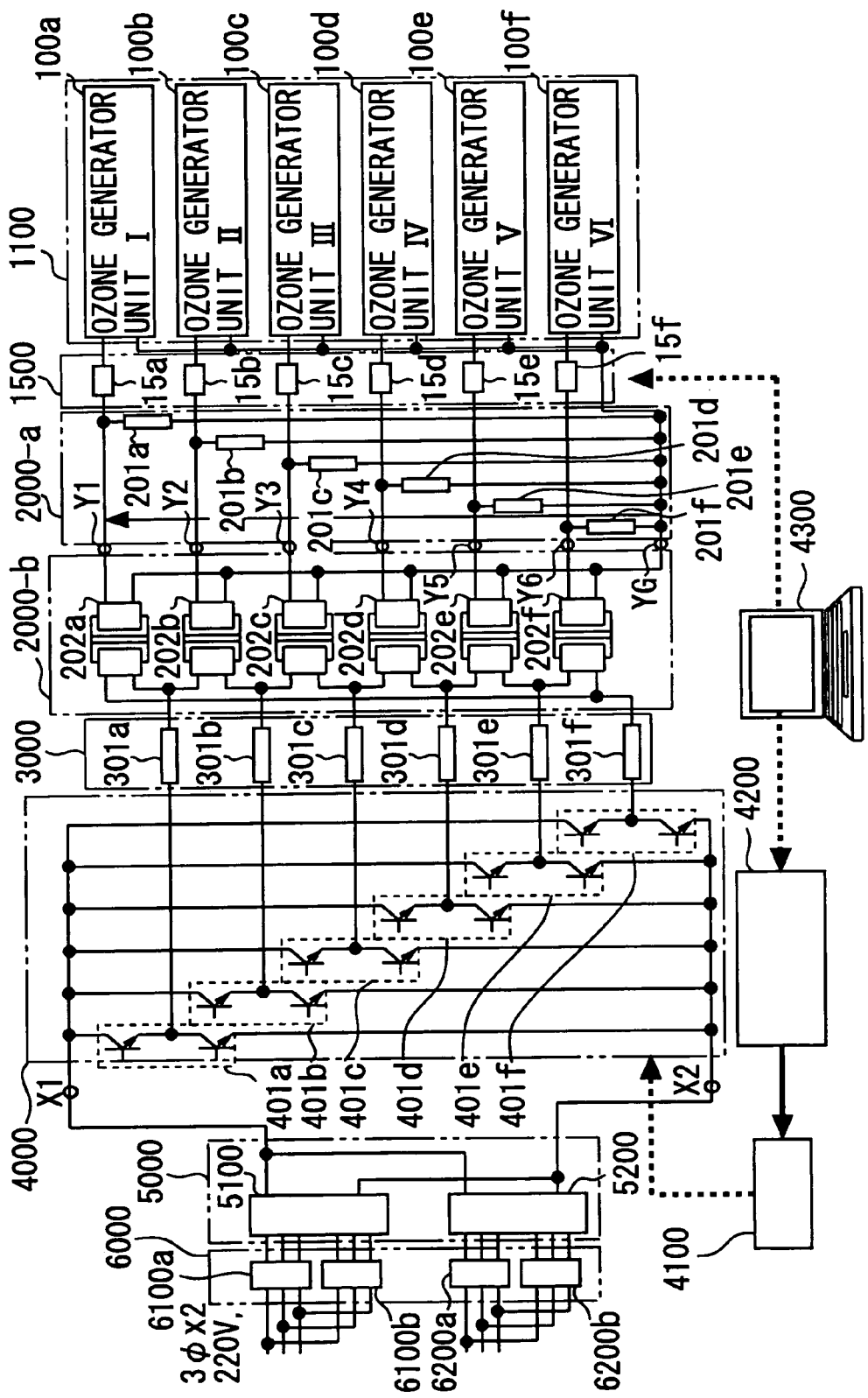
FIG. 1 is a schematic circuit diagram illustrating the overall system of an n-phase ozone generator that comprises a 6-phase inverter, reactor, and 6-phase transformer in accordance with a first embodiment of the present invention.
Figure 2:
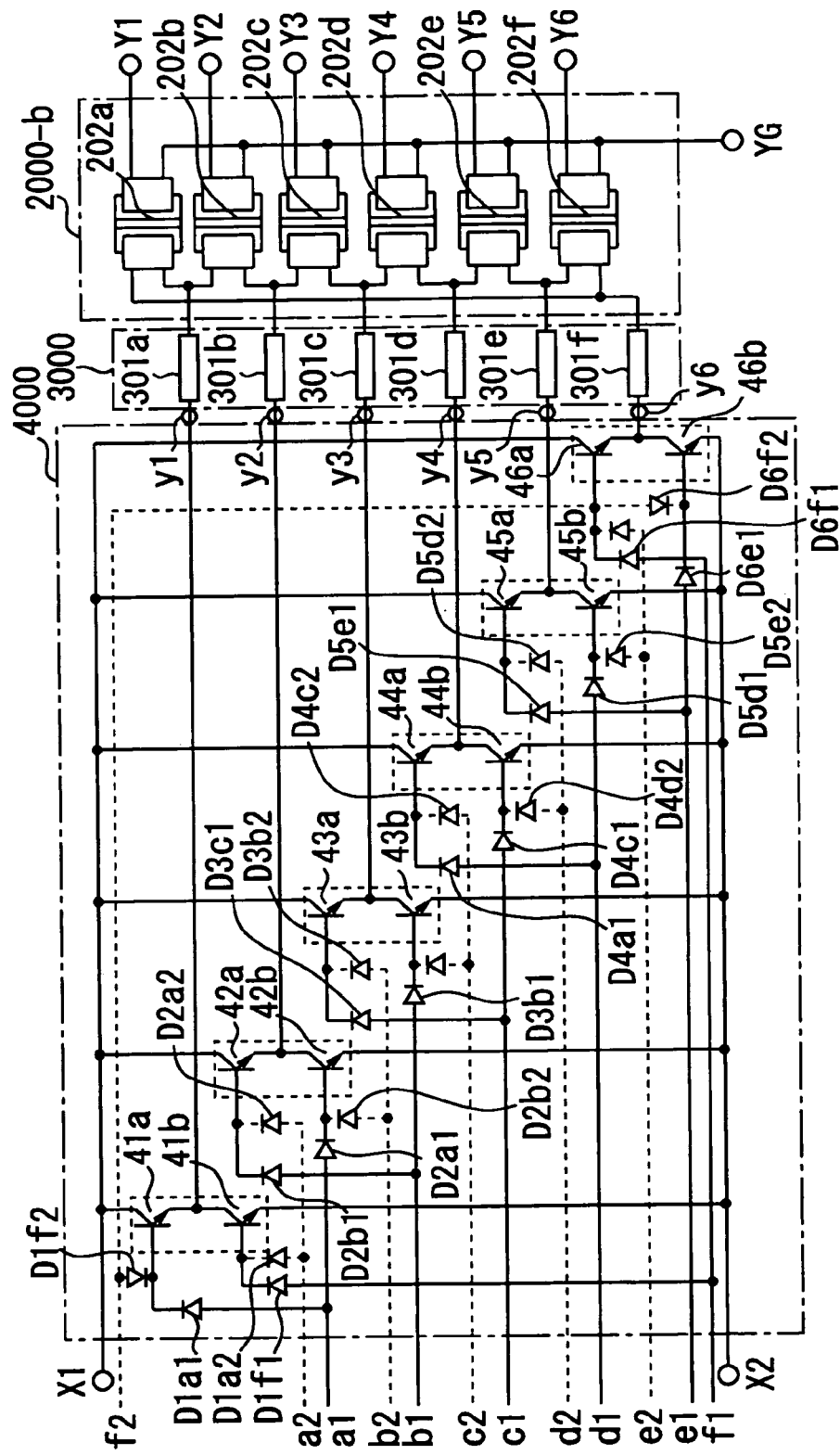
FIG. 2 is a diagram illustrating a main circuit and gate signal circuit of an n-phase inverter according to the first embodiment of the present invention.
Figure 3:
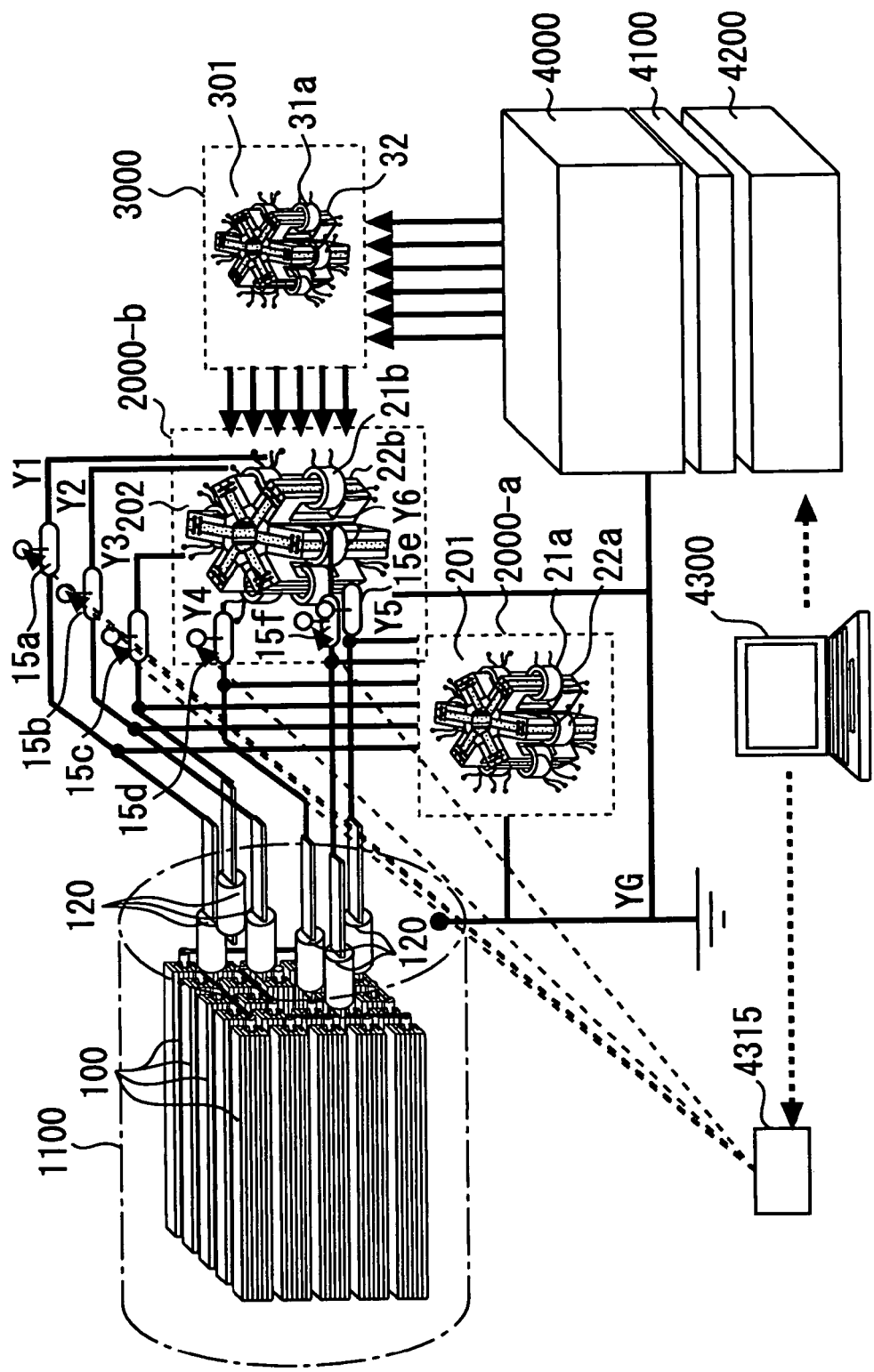
FIG. 3 is a detailed system configuration diagram illustrating various components of the n-phase ozone generator according to the first embodiment of the present invention.
Figure 4:
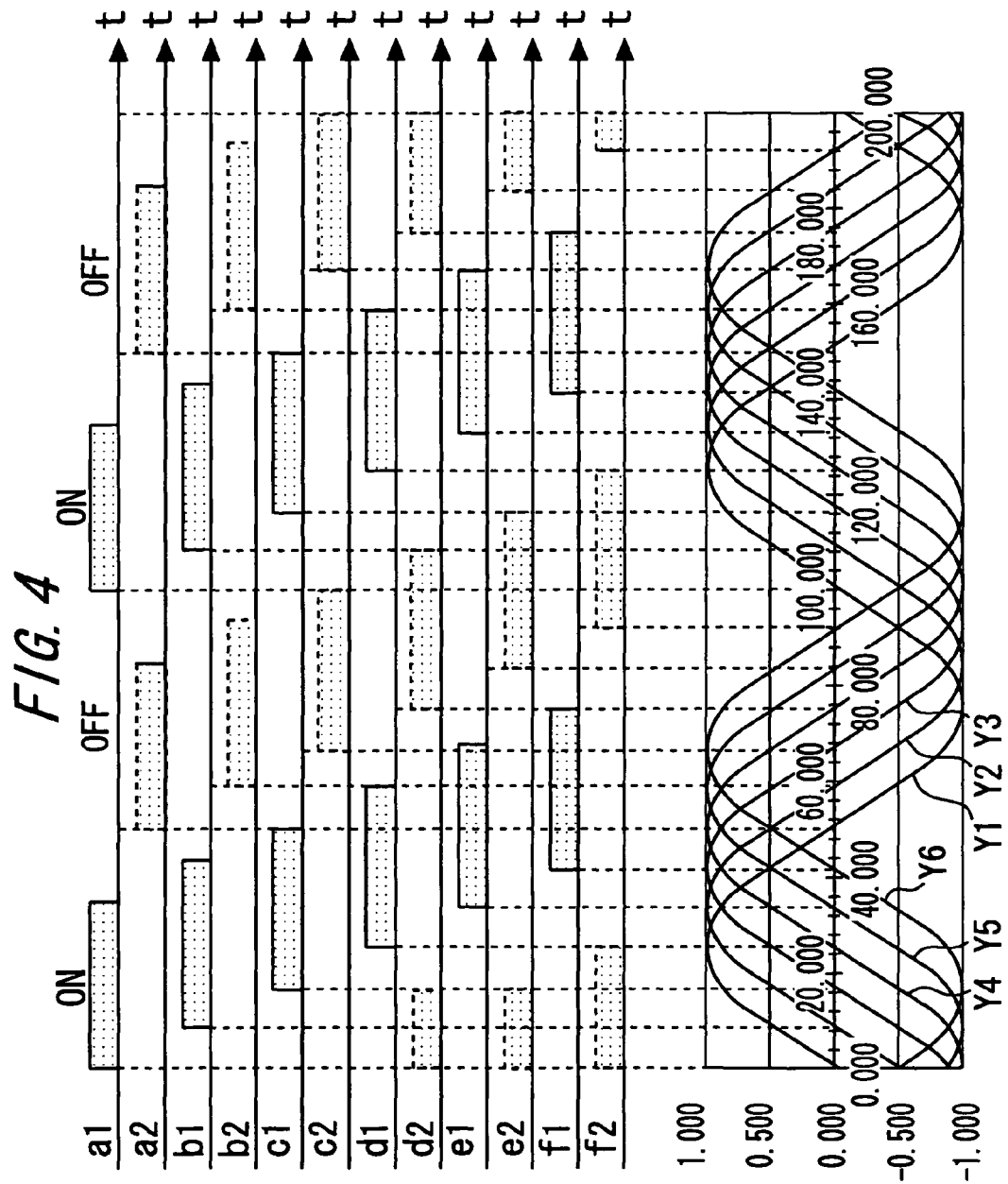
FIG. 4 is a characteristics diagram illustrating an instruction signal and inverter output waveform of an n-phase inverter according to the present invention.

FIG. 1 is a schematic circuit diagram illustrating the overall system of an n-phase ozone generator that comprises a 6-phase inverter, reactor, and 6-phase transformer in accordance with a first embodiment of the present invention. FIG. 2 is a diagram illustrating a main circuit and gate signal circuit of an n-phase inverter according to the first embodiment of the present invention. FIG. 3 is a detailed system configuration diagram illustrating various components of the n-phase ozone generator according to the first embodiment of the present invention. FIG. 4 is a characteristics diagram illustrating an instruction signal and inverter output waveform of an n-phase inverter according to the present invention.

FIG. 3 excludes a converter unit 5000 and an input transformer 6000, which are shown in FIG. 1.

In FIGS. 1 to 3, the reference numerals 100a-100f denote six ozone generator units, and the reference numeral 1100 denotes a 6-phase (n-phase) ozone generator that comprises six multi-layer flat-plate ozone generator units 100. FIGS. 1 to 3 illustrate a large-capacity ozone generator that generates ozone at a rate of 70 kg/h. The reference numeral 1500 denotes a fuse or breaker block, which comprises six fuses or six breakers 15a-15f that are capable of cutting off the six ozone generator units 100a-100f on an individual basis. The reference numeral 2000-a denotes a parallel reactor block, which comprises six parallel reactors 201a-201f that improve the power factor by making use of resonance with the six ozone generator units 100a-100f. The reference numeral 2000-b denotes a 6-phase (n-phase) transformer block, which comprises six transformers 202a-202f that supply a high voltage to the six ozone generator units 100a-100f. The reference numeral 3000 denotes a series reactor block, which comprises six series reactors 301a-301f that suppress an inverter output current. The reference numeral 4000 denotes a 6-phase (n-phase) inverter element block, which comprises six inverter elements 401a-401f that output a 6-phase voltage from a DC voltage input. The reference numeral 5000 denotes a converter (rectifier) block, which comprises a plurality of converters (rectifiers) 5100 and 5200 that supply the DC voltage to be input into the inverter elements 401a-401f. The reference numeral 6000 denotes an input transformer block, which comprises a plurality of input transformers 6100a, 6100b, 6200a and 6200b for cutting off a third harmonic that is induced by the loads of a commercial AC power supply and ozone generator. The reference numeral 4100 denotes an inverter drive circuit, which drives the 6-phase (n-phase) inverter element block 4000. The reference numeral 4200 denotes a control circuit for the 6-phase (n-phase) inverter element block 4000. The reference numeral 4300 denotes a computer that exercises management and issues setup condition instructions concerning, for instance, the status of the ozone generator and the electrical current output to the inverter. In FIGS. 1 and 2, the reference numerals a1, a2, b1, b2, c1, c2, d1, d2, e1, e2, f1, and f2 denote 6-phase (n-phase) inverter element gate instruction signals. The reference numeral X1 and X2 denote DC voltage inputs from the converter (rectifier) block 5000. The reference numeral Y1, Y2, Y3, Y4, Y5, and Y6 denote 6-phase (n-phase) high AC voltage outputs from the 6-phase (n-phase) transformer block 2000-b. These outputs are connected to n high-voltage terminals that output an n-phase high AC voltage. The symbol YG denotes a common low voltage (ground) for a 6-phase AC voltage, and is connected to a low-voltage terminal that outputs a low voltage, which has a common potential for n high voltages. In FIG. 2, the reference numerals D1a1-D6f2 denote a plurality of diodes that are provided for the gate instruction signals of the inverter elements 401a-401f. The reference numerals 41a-46b denote a plurality of power transistors that are provided for the inverter elements 401a-401f. It goes without saying that the ozone generator shown in FIGS. 1 and 3 requires an ozone generator water cooling mechanism and material gas supply structure as well as an ozone gas acquisition mechanism. However, these components are not shown in the figures because they are not directly related to the present invention. The reference numeral 120 denotes a high-voltage terminal for supplying a 6-phase (n-phase) high AC voltage to the six ozone generator units 100a-100f. The high AC voltages supplied to the ozone generator units 100a-100f differ in phase.

Referring to FIG. 1, commercial AC power is input into the input transformer block 6000 in order to supply a voltage to the ozone generator. The input transformer block 6000 electrically separates a commercial AC power supply from the ozone generator to ensure that an inverter ON/OFF signal and harmonic component from the ozone generator will not be superposed over commercial AC power. The converter (rectifier) block 5000 receives a secondary voltage of the input transformer block 6000, rectifies the received voltage, and outputs a DC voltage. The DC voltage generated from the converter block 5000 enters the 6-phase (n-phase) inverter element block 4000. In the 6-phase (n-phase) inverter element block 4000, a predetermined current and frequency (cycle) instruction, which are fed from the computer 4300, enter the control circuit 4200. The control circuit 4200 generates a 6-phase (n-phase) pulse waveform, which is divided into 6 phases (n phases) at predetermined intervals, and supplies the generated pulse waveform to the inverter drive circuit 4100. The inverter drive circuit 4100 increases the output to a level adequate for driving the inverter elements 401a-401f so that an ON/OFF pulse is fed to the inverter drive circuit 4100. The gate signal circuit of the 6-phase (n-phase) inverter element block 4000 is as indicated in FIG. 2. The pulse waveforms shown in FIG. 4 are input into the a1, a2, b1, b2, c1, c2, d1, d2, e1, e2, f1, and f2.

For example, an ON signal enters the gate circuit of power transistor 41a of inverter element 401a via diode D1a1 while the a1 is at phase 0 with a predetermined pulse width employed. In addition, the ON signal also enters the gate circuit of power transistor 42b of the next inverter element 401b via diode D2a1. Power transistors 41a and 42b then conduct so that a plus voltage is applied between y1 and y2 for the pulse width period.

Next, for the a2, the ON signal enters the gate circuit of power transistor 41b of inverter element 401a via diode D1a2. In addition, the ON signal also enters the gate circuit of power transistor 42a of the next inverter element 401b via diode D2a2. Power transistors 41b and 42a then conduct so that a minus voltage is applied between y1 and y2 for the pulse width period. The above gate signals a1, a2 are such that the ON and OFF signals alternately enter at predetermined intervals T. Therefore, the inverter outputs an AC rectangular waveform voltage having a period of T between y1 and y2.

Further, as regards b1 and b2, the pulse signal, whose phase is delayed by t (=T/n) with reference to the a1 and a2 signals, turn ON power transistors 42a and 43b of inverter elements 401b and 401c and power transistors 43a and 42b of inverter elements 401b and 401c alternately and repeatedly. As a result, an AC rectangular voltage waveform, whose phase is shifted by t from the AC rectangular waveform voltage between y1 and y2, is applied between y2 and y3.

In the manner described above, AC rectangular waveform voltages, which differ in phase from each other by t, are applied between y3 and y4, between y4 and y5, and between y6 and y1. When the plurality of AC voltages are input into the 6-phase (n-phase) transformer block 2000-b via the series reactors 301a-301f in the series reactor block 3000, the rectangular AC voltage waveforms are L components of the series reactors and transformers, and the delayed current waveform flows to the primary side of transformers. Therefore, 6-phase (n-phase) high-voltage waveforms Y1, Y2, Y3, Y4, Y5, and Y6, which are similar to a sine wave, are output to the secondary side of the 6-phase (n-phase) transformer block 2000-b. Uniform DC voltage superposition occurs to minimize the voltage to be applied to the inverter and suppress the withstand voltage of the inverter. Therefore, the primary side of the 6-phase (n-phase) transformer block 2000-b is circularly wired. The secondary side, which uses a common low-voltage potential (ground), is star-wired to output a 6-phase (n-phase) high-voltage waveform.

Referring to FIG. 3, 6-phase (n-phase) high-voltage waveforms Y1, Y2, Y3, Y4, Y5, and Y6 are such that the high-voltage terminal 120 supplies a 6-phase (n-phase) high AC voltage to the six ozone generator units 100a-100f via the six fuses or breakers 15a-15f in the fuse or breaker block 1500 for the purpose of cutting off the six ozone generator units 100a-100f on an individual basis. The high AC voltage supplies to the six ozone generator units 100a-100f differ in phase from each other. The low-voltage electrode shares a common potential (ground) with the apparatus housing, and is returned to the transformer block 2000-b by means of the YG.

Second Embodiment

In a second embodiment of the present invention, the parallel reactor block 2000-a includes six (n) reactors that are identical with each other. The parallel reactor block 2000-a is connected between the high-voltage side and low-voltage potential (ground) of the secondary side of the 6-phase (n-phase) transformer block 2000-b. The reactors 201a-201f are inserted into the ozone generator units 100a-100f in a parallel manner. The load on the ozone generator units 100 is a capacitance load because it is made of a dielectric. The load is a leading load. The power factor is as low as approximately 20%. Therefore, if, for instance, the employed design is such that a power of 10 kW is supplied to the ozone generator units 100, it is necessary that a power of approximately 50 kVA be supplied to each ozone generator unit 100 because the power factor is low. In other words, the design requirements are such that the transformer block 2000-b and inverter block 4000 have large capacities. This increases the production cost, weight, and cubic capacity, thereby giving rise to a problem. The scale of this problem increases with an increase in the capacity of the ozone generator.

To solve the above problem, the second embodiment provides the secondary side of the 6-phase (n-phase) transformer block 2000-b with the parallel reactor block 2000-a to invoke parallel resonance between the parallel reactors 201a, 201b, 201c, 201d, 201e, 201f and six (n) ozone generator units 100a-100f for power factor improvement. The power factor of the secondary side of the 6-phase (n-phase) transformer block 2000-b is greatly increased by more than 20%. The power factors of the transformer block 2000-b and inverter block 4000 are then improved so that extremely compact transformer block 2000-b and inverter block 400 result. In the event of the above 6-phase (n-phase) parallel resonance, the load current is used more effectively than when parallel resonance occurs in a single ozone generator unit. Therefore, the use of 6-phase (n-phase) parallel resonance is advantageous in that the resulting design size is smaller than when a single resonance reactor is used.

When resonance is to be invoked between the ozone generator units 100 and reactors, series resonance is frequently used in addition to parallel resonance. However, when a series resonance method is applied to a large-capacity ozone generator, the load impedance decreases. This not only makes it very difficult to control the load current to be supplied, but also degrades ozone concentration controllability and stability. As regards a small-capacity ozone generator, the use of series reactors is more advantageous because it is possible to reduce the supply voltage and the current flow to the reactors.

Third Embodiment

A third embodiment of the present invention will now be described with reference to FIG. 5. The third embodiment includes a time division device that is capable of equally dividing the time into 3 to n phases. When a designated phase count signal is entered into the time division device from the outside, the time division device issues an equally-time-divided signal to the inverter. Variable control can then be exercised for an arbitrary phase while maintaining balance gradually for 3 to n phases.

Figure 5:
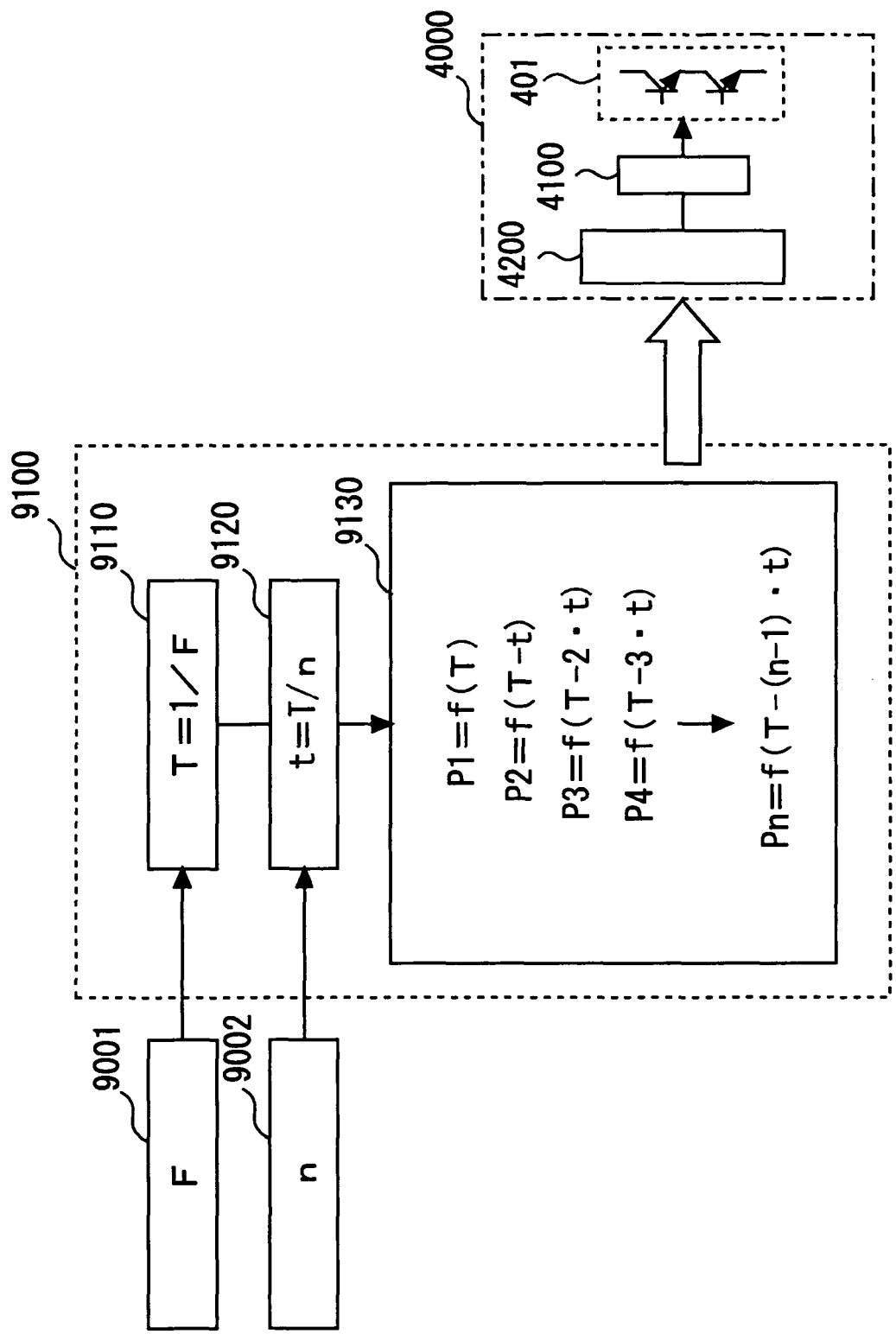
FIG. 5 is a block diagram illustrating an inverter control method for arbitrarily changing the number of inverter phases in accordance with a second embodiment of the present invention.
Figure 6:
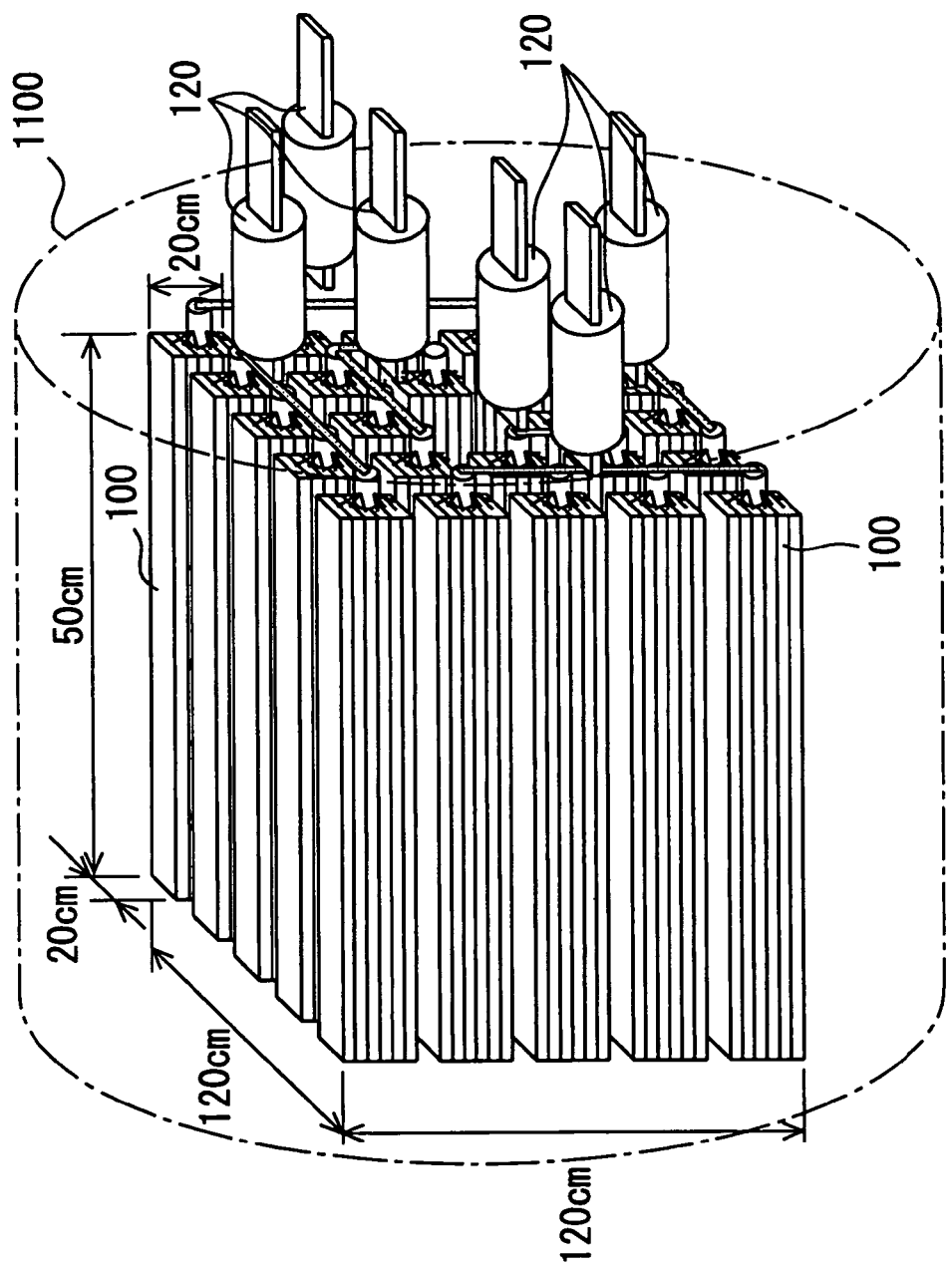
FIG. 6 illustrates the structure of a multi-layer flat-plate ozone generator according to an embodiment of the present invention.
Figure 7:
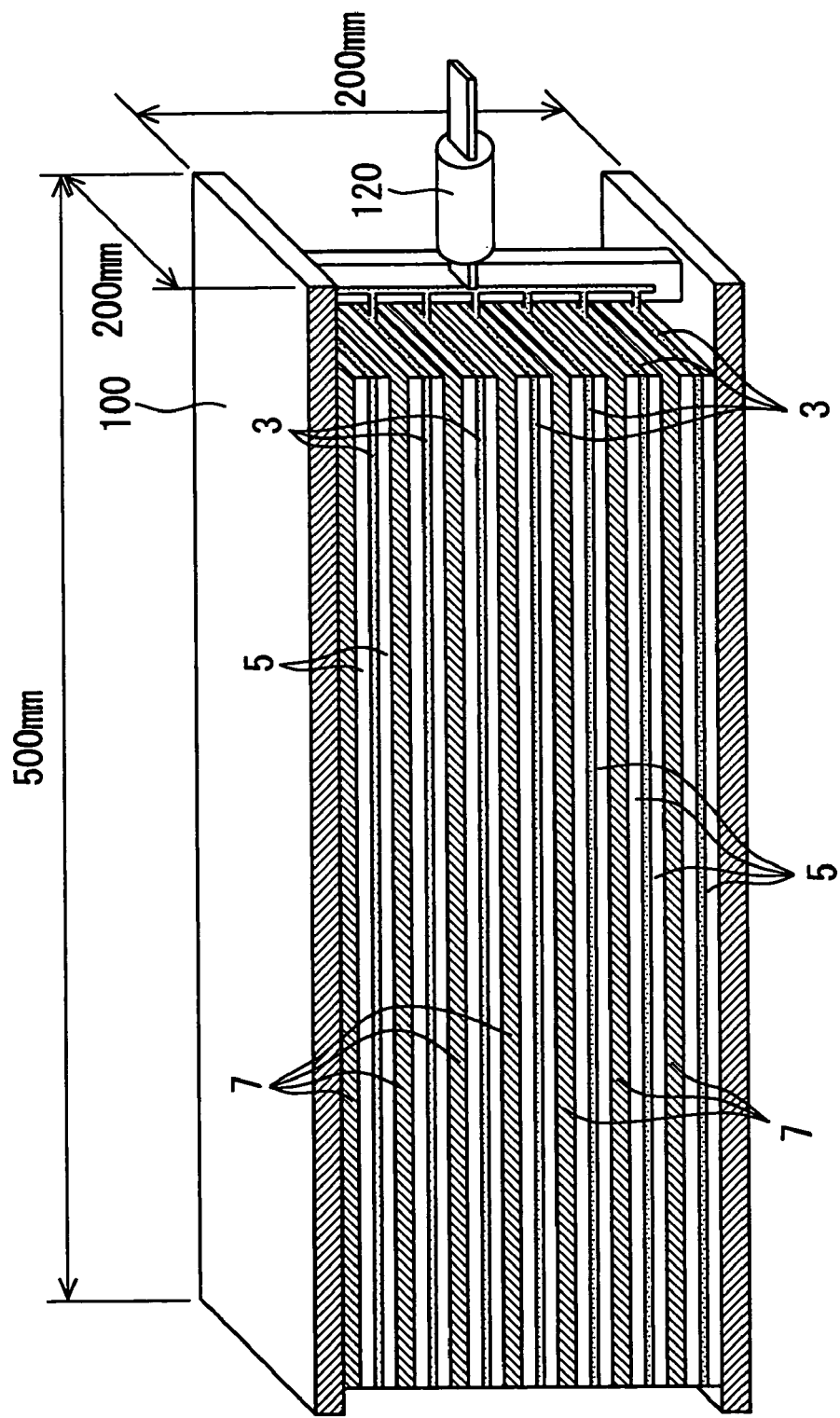
FIG. 7 is a schematic diagram illustrating the configuration of a multi-layer flat-plate ozone generator unit according to an embodiment of the present invention.

As indicated in FIG. 5, the computer 4300 enters the ozone generator frequency F and the number n of phases to be driven by the inverter. The computer 4300 calculates the intervals T for the inverter element block 4000 and the phase time t from entered n phases. Further, the computer 4300 calculates an inverter drive instruction for all phases of the inverter elements 401 via the control circuit 4200 and inverter drive circuit 4100.

Referring to FIG. 5, the reference numeral 9001 denotes an input signal for entering the frequency F. The reference numeral 9002 denotes an input signal for entering the number of phases n. The reference numeral 9100 denotes a computation block. The computation block 9100 includes a calculation block 9110 for calculating the intervals T, a calculation block 9120 for calculating the phase time t, and a calculation block 9130 for calculating the phase intervals appropriate for the number of phases. In addition to the input signals for the frequency F and the number of phases n, there is also a load current instruction signal for controlling the output of the ozone generator. However, the input signals that are not directly related to the invention for controlling the phase balance in relation to a change in the number of phases are excluded from the description. As regards the computation performed by the computation block 9100, the computation process for controlling phase balance in relation to a change in the number of phases is also excluded from the description.

The operation will now be described. For a large-scale system for water treatment, pulse bleaching by ozone, or the like, it is important that the operation be continuously performed for virtually 365 days a year. If the system is down for a long period of time due to a failure, the source material to be subjected to ozone treatment increases in amount. For a large-capacity ozone generator, therefore, it is important that recovery from failure be achieved with ease.

During a periodic inspection period during which the large-capacity ozone generator can be shut down for up to 24 hours, it is necessary to replace defective parts. If the apparatus becomes defective before a periodic inspection, it is necessary to resume the operation of the apparatus within a short period of time wherever possible. Therefore, if the apparatus becomes defective before a periodic inspection, it is necessary to locate a defective part accurately, remove the defective part, and resume a stable operation no matter whether the performance deteriorates slightly.

The present embodiment (third embodiment) relates to inverter section control that is exercised to make the 6-phase (n-phase) ozone generator operative with the number of phases decreased in a situation where the apparatus is partly defective. Referring to FIG. 5, when the computer 4300 specifies the frequency F and the number of phases n or unnecessary phase numbers concerning the inverter to be operated, the computation block 9160 computes the phase intervals, which are appropriate for the number of phases, from the frequency F and the number of phases n, and sends a signal to the inverter's control circuit 4200. The control circuit 4200 generates and forwards a pulse signal via the inverter drive circuit 4100 so that only a desired inverter element 401 in the inverter element block 4000 can be operated.

When the computer or the like computes the phase intervals in accordance with the number of phases described above so that the inverter can be operated in a manner appropriate for an arbitrary number of phases, the inverter can always operate while maintaining a balanced load. Therefore, even when the number of phases changes, it is possible to prevent the power supply input balance from being impaired due to improper load balance of the ozone generator. In other words, when a designated phase count signal is entered into a time division device from the outside in a situation where the time division device capable of equally dividing the time into 3 to n phases is furnished, the time division device issues an equally-time-divided signal to the inverter. Variable control can then be exercised for an arbitrary phase while maintaining balance gradually for 3 to n phases.

Another advantage of the third embodiment is that the operation can be resumed without removing the inverter wiring for a defective phase.

Fourth Embodiment

Figure 8:
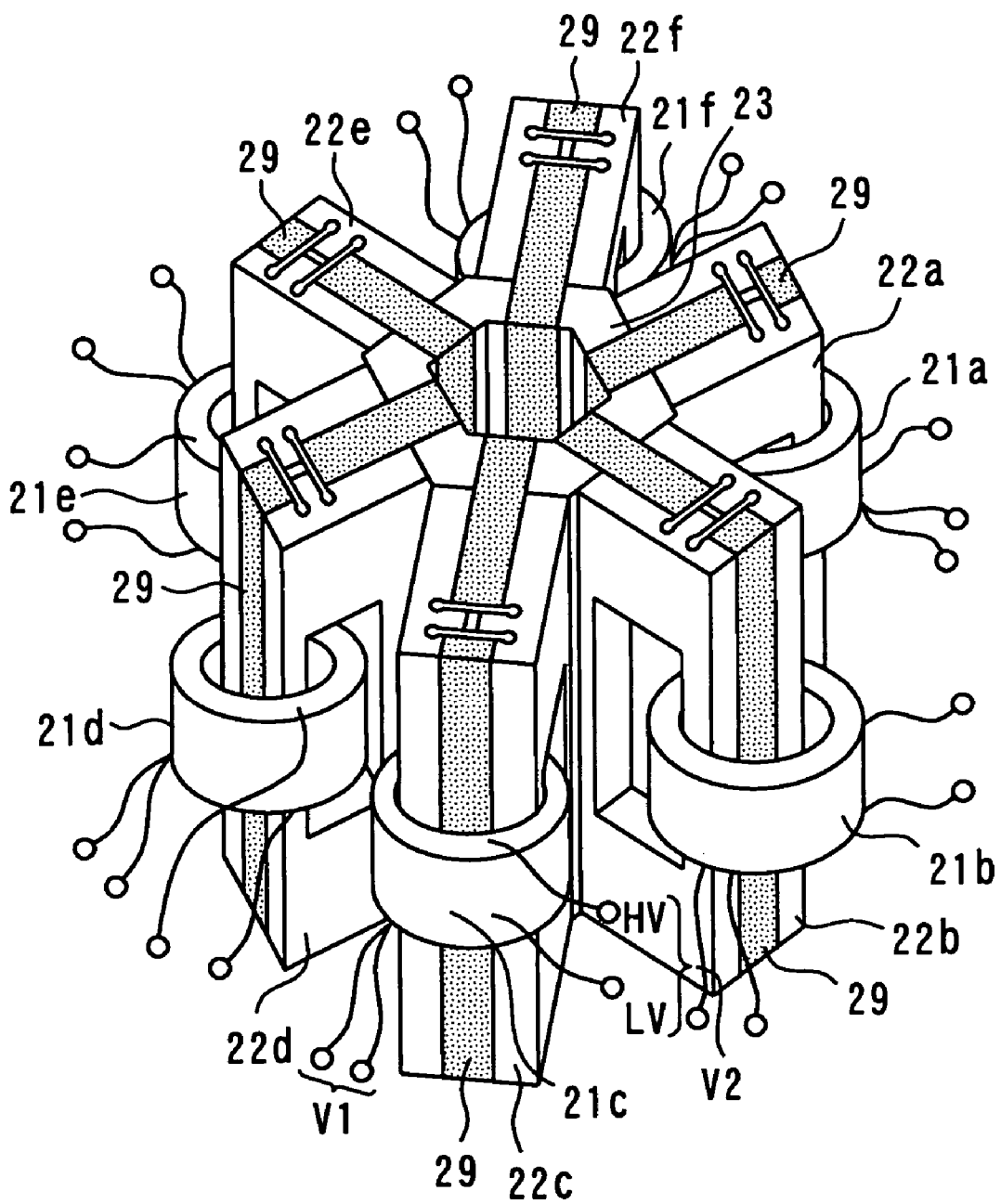
FIG. 8 illustrates the structures of an n-phase transformer and reactor according to a third embodiment of the present invention.

A fourth embodiment of the present invention will now be described with reference to FIG. 8. FIG. 8 illustrates the structure of the 6-phase (n-phase) parallel reactor 2000-*a* that improves the power factor by invoking resonance among the 6-phase (n-phase) series reactor 3000, 6-phase (n-phase) transformer 2000-*b* for raising the 6-phase (n-phase) AC voltage, and ozone generator load.

Referring to FIG. 8, the reference numerals 21*a*-21*f* denote the coils of 6-phase (n-phase) transformers or reactors. The reference numerals 22*a*-22*f* denote the U- or L-shaped cores of 6-phase (n-phase) transformers or reactors. The reference numeral 23 denotes an I-shaped core having a hexagonal (n-sided polygonal) cross section. The reference numeral 29 denotes a band for connecting the U- or L-shaped cores 22*a*-22*f* to the I-shaped core 23.

The operation will now be described. In the 6-phase (n-phase) ozone generator according to the fourth embodiment, the 6-phase (n-phase) series reactor 3000, 6-phase (n-phase) transformer 2000-*b*, and parallel reactor 2000-*a* (6-phase (n-phase) transformer) are combined with the U- or L-shaped magnetic cores 22*a*-22*f* to form a core, in which a magnetic loop is formed, on the polygonal surfaces of hexagonal (n-side polygonal) I-shaped magnetic body 29 and I-shaped magnetic core 29 in correspondence with the 6 phases (n phases) as shown in FIG. 8. The resulting magnetic core is provided with coils 21*a*-21*f* to form a one-piece 6-phase (n-phase) transformer and reactor.

When a one-piece 6-phase (n-phase) transformed is formed as described above, the 6-phase (n-phase) transformer size can be reduced.

Fifth Embodiment

Figure 9:
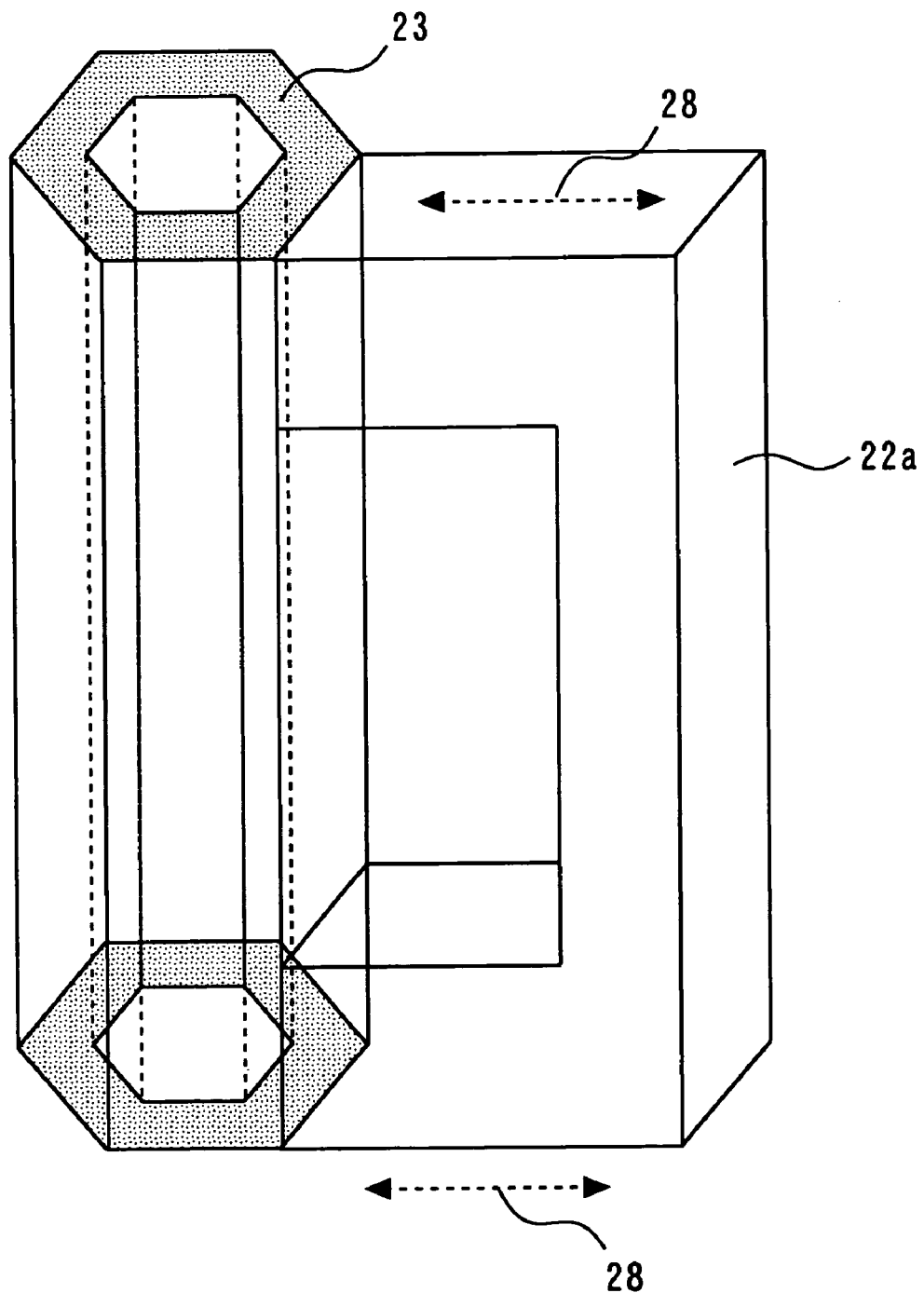
FIG. 9 illustrates the structures of an n-phase transformer and reactor mounting/demounting mechanism according to a fourth embodiment of the present invention.
Figure 10:
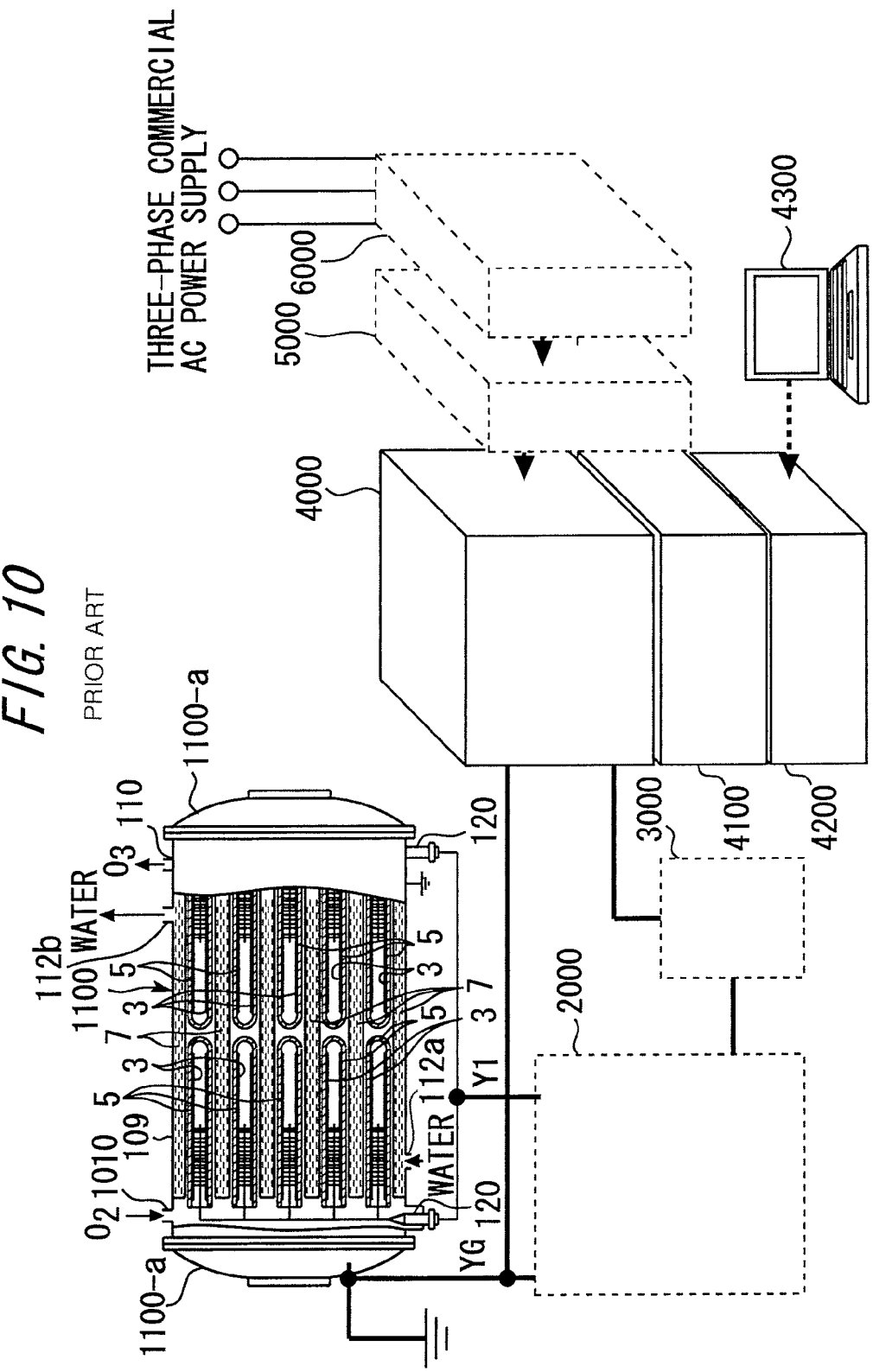
FIG. 10 is a schematic system diagram illustrating the configuration of a conventional large-capacity ozone generator.
Figure 11:
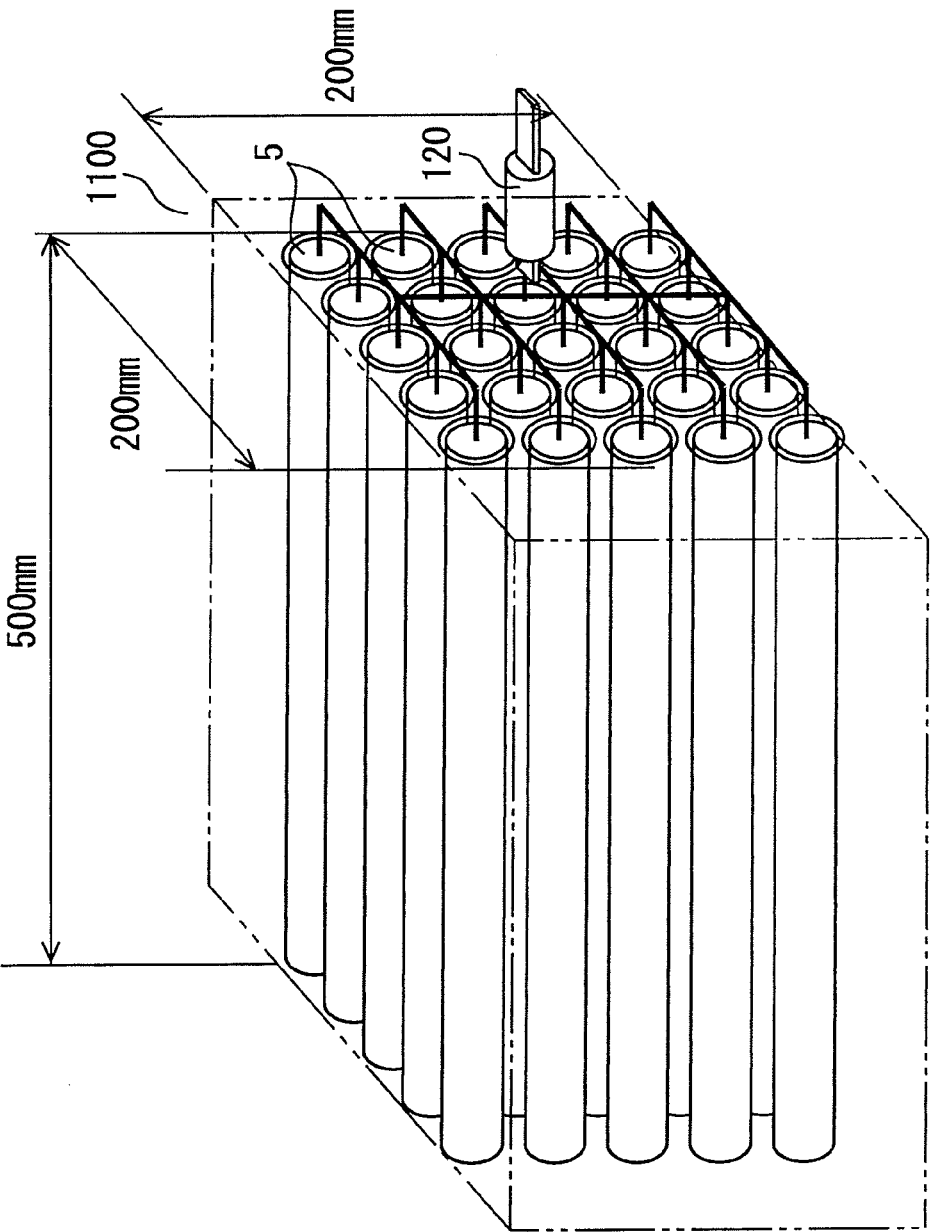
FIG. 11 illustrates the electrode structure of a conventional ozone generator unit.
Figure 12:
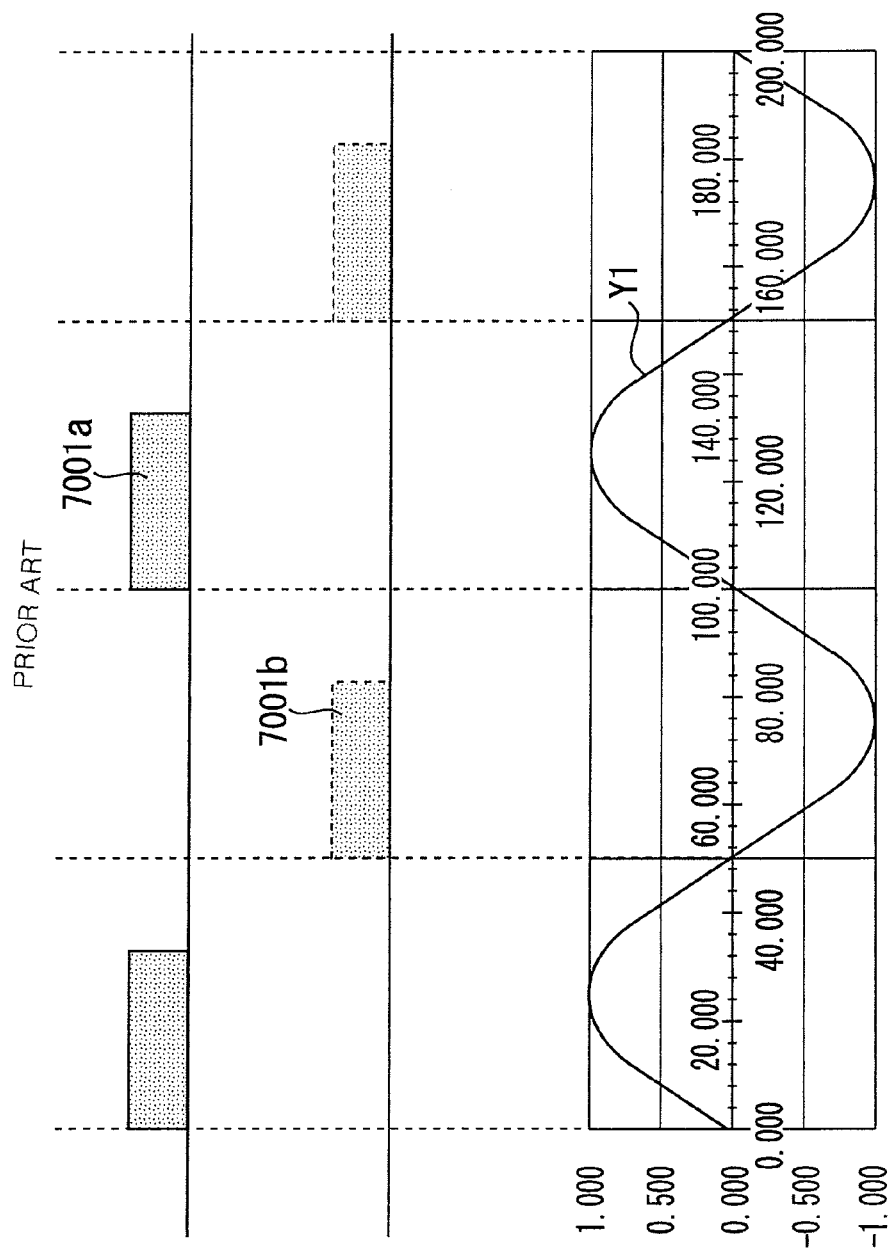
FIG. 12 illustrates an inverter instruction signal and inverter output waveform of a conventional ozone generator.
Figure 13:
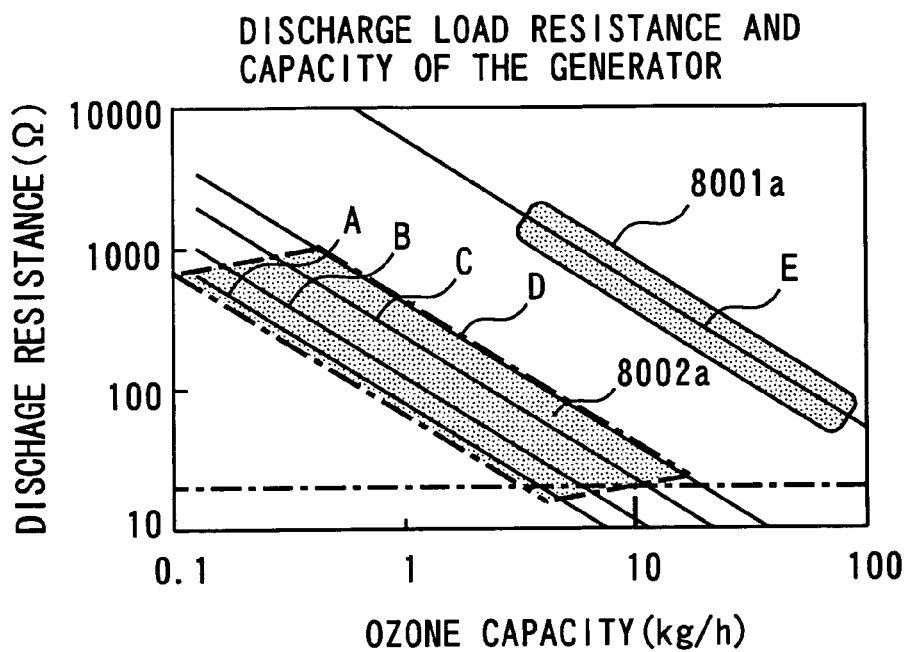
FIG. 13 is a characteristics diagram illustrating the relationship between the ozone capacity and discharge load resistance of an ozone generator.
Figure 14:
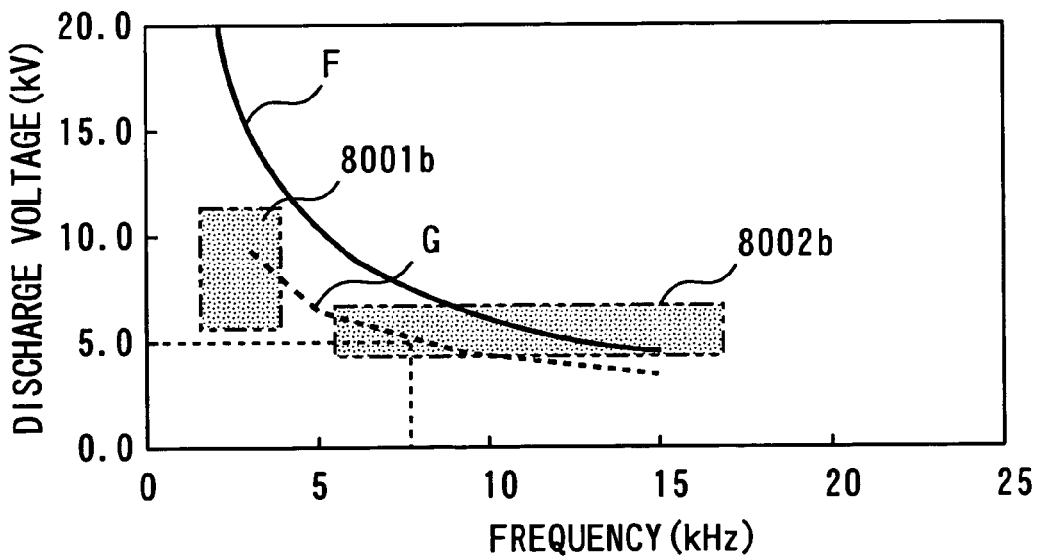
FIG. 14 is a characteristics diagram illustrating the relationship between the operating frequency of an ozone generator power supply and the load voltage to be applied.
Figure 15:
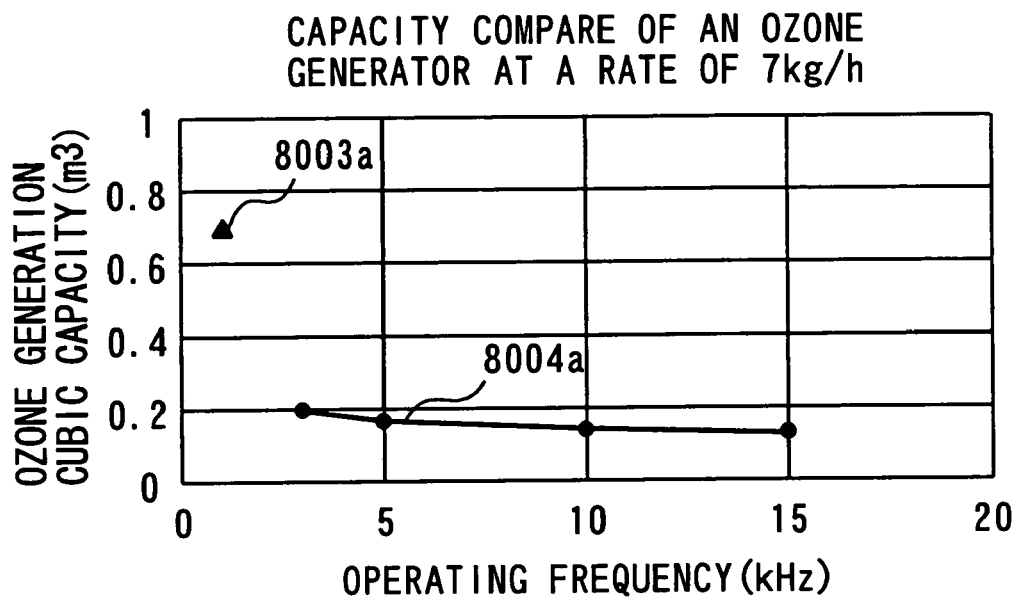
FIG. 15 is a characteristics diagram illustrating the capacity characteristic of an ozone generator that generates ozone at a rate of 7 kg/h.
Figure 16:
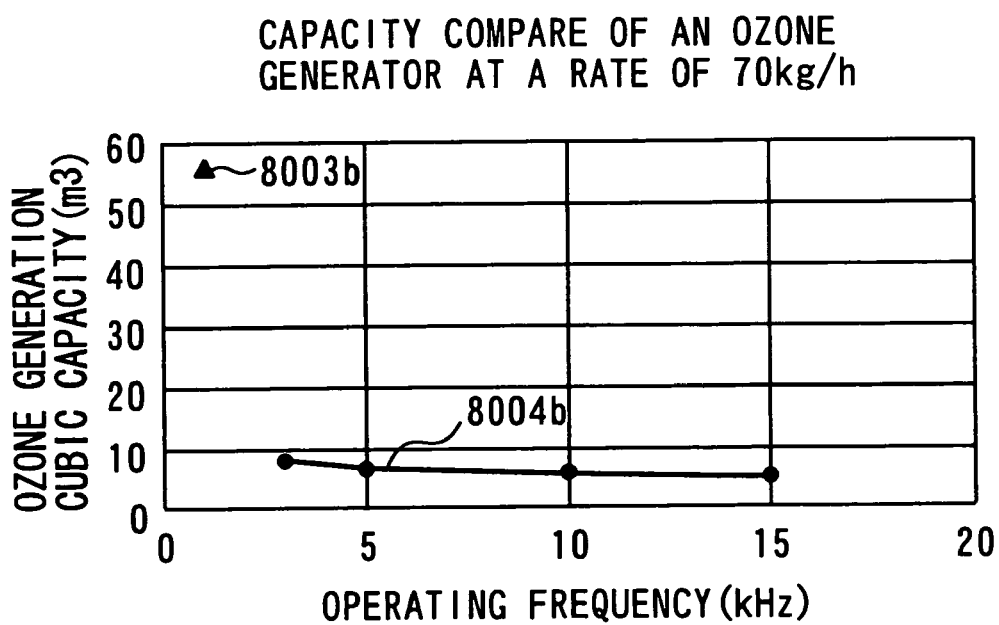
FIG. 16 is a characteristics diagram illustrating the capacity characteristic of an ozone generator that generates ozone at a rate of 70 kg/h.
Figure 17:
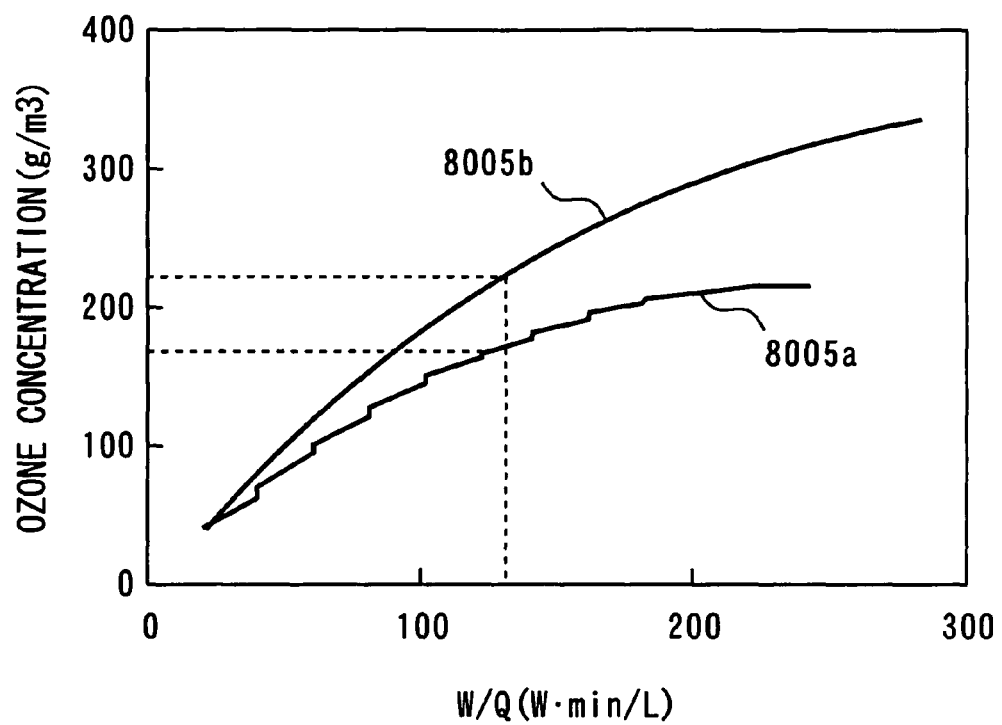
FIG. 17 is a characteristics diagram illustrating the ozone performance of an ozone generator.

A fifth embodiment of the present invention will now be described with reference to FIG. 9. FIG. 9 shows a structure that makes it easy to increase or decrease the number of phases of the 6-phase (n-phase) parallel reactor 2000-*a*, which improves the power factor by invoking resonance among the 6-phase (n-phase) series reactor 3000, 6-phase (n-phase) transformer 2000-*b* for raising the 6-phase (n-phase) AC voltage, and ozone generator load.

The operation will now be described. A one-piece 6-phase (n-phase) transformer according to the fifth embodiment is structured so that the magnetic core can easily be removed together with the coil 21 by removing a band 29 that retains the U- or L-shaped magnetic core of a 6-phase (n-phase) transformer. Therefore, the transformer related to a defective phase can be removed so that ozone generator system recovery can be promptly achieved.

Sixth Embodiment

A sixth embodiment of the present invention will now be described. The sixth embodiment is configured so that fuses or breakers 15*a*-15*f* are provided in series with the high-voltage terminals 120 of the 6-phase (n-phase) ozone generator units. Therefore, it is possible to cut off a defective ozone generator unit 100 and one inverter element phase.

The fuses or breakers 15*a*-15*f*, which are connected in series with the high-voltage terminals 120 of the 6-phase (n-phase) ozone generator units, may alternatively be connected in series with the high-voltage output terminal on the secondary side of the transformer 2000-b.

If an overcurrent flows in a certain phase in a situation where the fuses or breakers 15a-15f are provided for each ozone generator unit 100, the operation is continuously performed with the phase affected by the overcurrent automatically cut off. Further, if the computer 4300 operates the breakers 15a-15f via breaker operation means 4315 as indicated in FIG. 3 to forcibly cut off a phase from the outside, the operation can be continued without removing the phase that is cut off.

Seventh Embodiment

A seventh embodiment of the present invention will now be described. The seventh embodiment includes a current detector (not shown) for detecting the current flow in each section of the 6-phase (n-phase) ozone generator. The current detector automatically detects the electrical current values of the input and output currents of the input transformer, the output current of the converter, and the inverter element output current, series reactor output current, transformer output current, parallel reactor current, and ozone generator unit current of each phase, automatically detects any defective part, and shuts down the apparatus or isolates a defective phase. The current detector monitors the electrical current value of each section to check whether the detected electrical current value is within a predetermined range, detects any defect in the input transformer, the converter, or the inverter element, series reactor, transformer, parallel reactor, or ozone generator unit of a certain phase, and shuts down the apparatus or automatically isolates a defective phase.

Various sections of each ozone generator unit 100 are provided with the current detector. More specifically, the current detector is provided for the input and output sections of the input transformer, the converter output section, and the inverter output section, series reactor section, transformer output section, parallel reactor section, and ozone generator section of each phase. The current detector detects as needed the input and output current values of the input transformer, the converter output current value, and the inverter output current value, series reactor current value, transformer output current value, parallel reactor current value, and ozone generator unit current value of each phase. The detected current values are entered into the computer 4300 to check for an overcurrent, which is larger than the rated current value, or an undercurrent, which is smaller than the rated current value. Any section whose current value is outside the rated current range is then selected to locate a defect in the input transformer, the converter section, or the inverter output section, series reactor section, transformer output section, parallel reactor section, or ozone generator unit of a certain phase. Finally, the apparatus shuts down or automatically isolates a defective phase.

As described above, the large-capacity ozone generator monitors the current in each section of the system as needed, locates a defect immediately, and shuts down or automatically isolates a defective phase. As a result, the large-capacity ozone generator can be repaired promptly and operated again.

Eighth Embodiment

An eighth embodiment of the present invention will now be described. The eighth embodiment includes a voltage detector for detecting the voltage in each section of the 6-phase (n-phase) ozone generator. The voltage detector automatically detects the voltage values of the input and output voltages of the input transformer, the output voltage of the converter, and the inverter output voltage, series reactor section voltage, transformer input voltage, transformer output voltage, parallel reactor section voltage, and ozone generator unit voltage of each phase, automatically detects any defective part, and shuts down the apparatus or isolates a defective phase. The voltage detector monitors the voltage value of each section to check whether the detected voltage value is within a predetermined range, detects any defect in the input transformer, the converter, or the inverter element, series reactor, transformer, parallel reactor, or ozone generator unit of a certain phase, and shuts down the apparatus or automatically isolates a defective phase.

Various sections of each ozone generator unit 100 are provided with the voltage detector. More specifically, the voltage detector is provided for the input and output sections of the input transformer, the converter output section, and the inverter output section, series reactor section, transformer output section, parallel reactor section, and ozone generator section of each phase. The voltage detector detects as needed the input and output voltage values of the input transformer, the converter output voltage value, and the inverter output voltage value, series reactor voltage value, transformer output voltage value, parallel reactor voltage value, and ozone generator section voltage value of each phase. The detected voltage values are entered into the computer 4300 to check whether the detected voltage values are within a specified rated voltage range. Any section whose voltage value is outside the rated voltage range is then selected to locate a defect in the input transformer, the converter section, or the inverter output section, series reactor section, transformer output section, parallel reactor section, or ozone generator section of a certain phase. Finally, the apparatus shuts down or automatically isolates a defective phase.

As described above, the large-capacity ozone generator monitors the voltage in each section of the system as needed, locates a defect immediately, and shuts down or automatically isolates a defective phase. As a result, the large-capacity ozone generator can be repaired promptly and operated again.

Further, when the current and voltage of each section are both monitored as needed, defect detection can be achieved earlier.

INDUSTRIAL APPLICABILITY

The n-phase ozone generator according to the present invention can be used as a large-capacity ozone generator for advanced sewage treatment or pulp bleaching, which requires a large amount of high-concentration ozone.

The invention claimed is:
1. An ozone generating apparatus comprising:
an ozone generator including
a discharge chamber having a high voltage terminal and a low voltage terminal, and
a plurality of multi-layer flat-ozone generating units stacked within the discharge chamber, each ozone generating unit including, alternately stacked, a plurality of flat-plate high-voltage electrodes and low-voltage electrodes, wherein the multi-layer flat-plate ozone generating units are electrically divided into n groups within the discharge chamber, high-voltage electrode terminals of the multi-layer flat-plate ozone generating units within each group are connected together, and low-voltage electrode terminals of all multi-layer flat-plate ozone generating units are connected together; and an n-phase power supply supplying power to the plurality of multi-layer flat-ozone generating units, the n-phase power supply including
a polyphase rectifier rectifying polyphase alternating current (AC) power received from a commercial power source to produce a rectified voltage,
an n-phase inverter receiving the rectified voltage and producing n-phase AC power, in each of n phases, at a higher frequency than the AC power received from the commercial source,
n serial reactors, one serial reactor being connected in series with each of the phases of the n-phase AC power, and
an n-phase transformer receiving the n-phase AC power transmitted by the n serial reactors and increasing the voltage of the n-phase AC power to produce n-phase high voltage AC power, each phase of the n-phase transformer being connected to a respective high-voltage electrode terminal of a corresponding group of the multi-layer flat-plate ozone generating units; and
a time division device equally dividing time into at least 3 and no more than n respective sequential intervals and issuing time-decoded signals to the n-phase inverter for controlling phases of the n-phase inverter while maintaining balance gradually for at least 3 of the phases and up to all of the n phases.

2. The ozone generating apparatus according to claim 1, wherein the n-phase power supply includes a single low-voltage output that is electrically connected to the low-voltage electrode terminal of the discharge chamber.

3. The ozone generating apparatus according to claim 2 including n parallel reactors, each parallel reactor being connected between a respective phase of the n-phase transformer and the low-voltage terminal of the discharge chamber.

4. The ozone generating apparatus according to claim 1, wherein the n-phase transformer includes
a central polygonal core having a polygonal cross-section with at least n sides,
a plurality of U-shaped or L-shaped cores, each core being attached to a respective side of the polygonal central core, and
a respective transformer coil wound around each corresponding U-shaped or L-shaped core, with the coils electrically interconnected in a delta or star arrangement.

5. The ozone generating apparatus according to claim 4 including respective releasable straps attaching the corresponding U-shaped or L-shaped cores to the polygonal central core for mounting and demounting the U-shaped and L-shaped cores.

6. The ozone generating apparatus according to claim 1, wherein the n-phase transformer includes
a central polygonal core having a polygonal cross-section with at least n sides,
a plurality of U-shaped or L-shaped cores, each core being attached to a respective side of the polygonal central core, and
a respective reactor coil wound around each corresponding U-shaped or L-shaped core, with the coils electrically interconnected in a delta or star arrangement.

7. The ozone generating apparatus according to claim 6 including respective releasable straps attaching the corresponding U-shaped or L-shaped cores to the polygonal central core for mounting and demounting the U-shaped and L-shaped cores.

8. The ozone generating apparatus according to claim 1 including n fuses or breakers, each fuse or breaker being connected between a respective group of the ozone generating units and a corresponding phase of the n-phase power supply.

9. The ozone generating apparatus according to claim 1, wherein the n-phase power supply detects current flow in each phase and, when the current flow in a phase exceeds a predetermined value, that phase is electrically isolated.

10. The ozone generating apparatus according to claim 1, wherein the n-phase power supply detects the voltage of each phase and, when the voltage of a phase falls below a predetermined value, the phase is electrically isolated.

11. An ozone generating apparatus comprising:
an ozone generator including
a discharge chamber having a high voltage terminal and a low voltage terminal, and
a plurality of multi-layer flat-ozone generating units stacked within the discharge chamber, each ozone generating unit including, alternately stacked, a plurality of flat-plate high-voltage electrodes and low-voltage electrodes, wherein the multi-layer flat-plate ozone generating units are electrically divided into n groups within the discharge chamber, high-voltage electrode terminals of the multi-layer flat-plate ozone generating units within each group are connected together, and low-voltage electrode terminals of all multi-layer flat-plate ozone generating units are connected together; and
an n-phase power supply supplying power to the plurality of multi-layer flat-ozone generating units, the n-phase power supply including
a polyphase rectifier rectifying polyphase alternating current (AC) power received from a commercial power source to produce a rectified voltage,
an n-phase inverter receiving the rectified voltage and producing n-phase AC power, in each of n phases, at a higher frequency than the AC power received from the commercial source,
n serial reactors, one serial reactor being connected in series with each of the phases of the n-phase AC power, and
an n-phase transformer receiving the n-phase AC power transmitted by the n serial reactors and increasing the voltage of the n-phase AC power to produce n-phase high voltage AC power, each phase of the n-phase transformer being connected to a respective high-voltage electrode terminal of a corresponding group of the multi-layer flat-plate ozone generating units, wherein the n-phase transformer includes
a central polygonal core having a polygonal cross-section with at least n sides,
a plurality of U-shaped or L-shaped cores, each core being attached to a respective side of the polygonal central core, and
a respective transformer coil or reactor coil wound around each corresponding U-shaped or L-shaped core, with the coils electrically interconnected in a delta or star arrangement.

12. The ozone generating apparatus according to claim 11 including respective releasable straps attaching the corresponding U-shaped or L-shaped cores to the polygonal central core for mounting and demounting the U-shaped and L-shaped cores.

13. The ozone generating apparatus according to claim 11, wherein the n-phase power supply includes a single low-voltage output that is electrically connected to the low-voltage electrode terminal of the discharge chamber.

14. The ozone generating apparatus according to claim 13 including n parallel reactors, each parallel reactor being connected between a respective phase of the n-phase transformer and the low-voltage terminal of the discharge chamber.

15. The ozone generating apparatus according to claim 11 including n fuses or breakers, each fuse or breaker being connected between a respective group of the ozone generating units and a corresponding phase of the n-phase power supply.

16. The ozone generating apparatus according to claim 11, wherein the n-phase power supply detects current flow in each phase and, when the current flow in a phase exceeds a predetermined value, that phase is electrically isolated.

17. The ozone generating apparatus according to claim 11, wherein the n-phase power supply detects the voltage of each phase and, when the voltage of a phase falls below a predetermined value, the phase is electrically isolated.

* * * * *